(12) United States Patent
Voss et al.

(10) Patent No.: US 12,472,879 B2
(45) Date of Patent: Nov. 18, 2025

(54) BICYCLE RACK FOR A VEHICLE

(71) Applicant: Rock Solid Industries International (Pty) Ltd, Pietermaritzburgh (CA)

(72) Inventors: Michael Voss, Fort Worth, TX (US); Jozua Hermanus Joubert, Benbrook, TX (US)

(73) Assignee: Rock Solid Industries International (Pty) Ltd, Pietermaritzburgh (ZA)

( * ) Notice: Subject to any disclaimer, the term of this patent is extended or adjusted under 35 U.S.C. 154(b) by 122 days.

(21) Appl. No.: 18/291,154

(22) PCT Filed: Jun. 3, 2022

(86) PCT No.: PCT/US2022/032197
§ 371 (c)(1),
(2) Date: Jan. 22, 2024

(87) PCT Pub. No.: WO2023/009216
PCT Pub. Date: Feb. 2, 2023

(65) Prior Publication Data
US 2024/0278730 A1    Aug. 22, 2024

(30) Foreign Application Priority Data
Jul. 28, 2021   (ZA) ................... 2021/05329

(51) Int. Cl.
*B60R 9/10*    (2006.01)
*B60R 9/06*    (2006.01)

(52) U.S. Cl.
CPC . *B60R 9/10* (2013.01); *B60R 9/06* (2013.01)

(58) Field of Classification Search
CPC .. B60R 9/10; B60R 9/06; B60R 9/045; B60R 9/058
See application file for complete search history.

(56) References Cited

U.S. PATENT DOCUMENTS

| | | | | |
|---|---|---|---|---|
| 4,406,384 A | * | 9/1983 | Schantz | B60R 9/06 224/508 |
| 5,884,824 A | * | 3/1999 | Spring, Jr. | B60R 9/042 224/325 |

(Continued)

FOREIGN PATENT DOCUMENTS

WO     2014/171844 A1    10/2014

OTHER PUBLICATIONS

International Preliminary Report on Patentability of PCT/US2022/032197 dated Jan. 18, 2024.

(Continued)

*Primary Examiner* — Brian D Nash
(74) *Attorney, Agent, or Firm* — K&L Gates LLP

(57) ABSTRACT

A bicycle rack includes a pair of elongated sliding members, a plurality of connecting elements for slidably connecting the elongated sliding members to the roof of the vehicle or the roof connectors of the vehicle, a pair of elongated, telescopic arms, wherein each arm comprises a first end connected to a respective one of the elongated sliding members, and wherein a rack securing element is provided at a second end of one or both of the arms, and at least one wheel supporting member, wherein the wheel supporting member has a first section pivotably connected to one of the elongated sliding members and a second section defining a wheel support.

15 Claims, 19 Drawing Sheets

(56) References Cited

U.S. PATENT DOCUMENTS

| | | | |
|---|---|---|---|
| 9,073,492 B1 * | 7/2015 | Shen | B60R 9/10 |
| 9,987,994 B2 * | 6/2018 | Fifield | B60R 9/10 |
| 10,040,402 B1 * | 8/2018 | Brusselback | B60R 9/042 |
| 11,059,428 B1 * | 7/2021 | Weil | B60R 9/045 |
| D930,554 S * | 9/2021 | Voss | D12/406 |
| 11,945,412 B1 * | 4/2024 | Brusselback | B60R 9/10 |
| 2002/0053581 A1 | 5/2002 | Peschmann et al. | |
| 2007/0102464 A1 * | 5/2007 | Garoffolo | B60R 9/10 |
| | | | 224/310 |
| 2011/0240700 A1 | 10/2011 | Williams | |
| 2012/0000952 A1 | 1/2012 | Dreger et al. | |
| 2013/0322997 A1 * | 12/2013 | Ziaylek | B60P 3/1016 |
| | | | 414/556 |
| 2014/0124551 A1 * | 5/2014 | Condon | B60R 9/048 |
| | | | 224/324 |
| 2020/0001797 A1 * | 1/2020 | Chen | B62D 33/02 |
| 2020/0180515 A1 * | 6/2020 | Dimmen | A47B 88/45 |
| 2022/0048439 A1 * | 2/2022 | Casagrande | F16B 7/0413 |
| 2023/0134010 A1 * | 5/2023 | Sampou | B60R 9/042 |
| | | | 414/462 |
| 2023/0331171 A1 * | 10/2023 | Wronski | B60R 9/06 |
| 2023/0398948 A1 * | 12/2023 | Li | B60R 9/10 |
| 2025/0115318 A1 * | 4/2025 | Teague | B62H 3/08 |
| 2025/0178541 A1 * | 6/2025 | Voss | B60R 9/045 |

OTHER PUBLICATIONS

International Search Report of PCT/US2022/032197 dated Sep. 8, 2022.
Written Opinion of PCT/US2022/032197 dated Sep. 8, 2022.

* cited by examiner

BICYCLE RACK FOR A VEHICLE

BACKGROUND

The present disclosure generally relates to a bicycle rack for a vehicle, and particularly for an automobile. A bicycle rack, also known as a bicycle carrier, is a device attached to a vehicle such as a car, truck or bus to which bicycles (one or more) can be mounted for transport. Various designs and configurations have been developed over the years. Some bicycle racks are configured to secure bicycles above the roof of the vehicle, while others secure bicycles behind the vehicle. Some bus mounted bicycle racks are attached to the front of a bus. Referring specifically to automobiles (not including buses), bicycle racks are typically configured to be attached to the roof, rear trunk, rear tow hitch, or the rear of a truck bed, depending on the design and the automobile. Accordingly, these bicycle racks typically mount the bicycle/s either above the roof or behind the vehicle.

The Applicant identified a need for a bicycle rack that can be easily attached to a roof of an automobile, either directly or to rails or bars installed on the roof (e.g. to rails installed on a pickup truck, or "bakkie" as it is known in southern Africa), but that allows bicycles to be mounted behind the vehicle instead of above the roof. Furthermore, the Applicant identified a need for a bicycle rack that can remain attached to the roof, rails or bars when not transporting bicycles without impeding or complicating access to the rear storage area of the automobile. The present disclosure aims to address the needs identified above, at least to some extent, and/or to provide a useful alternative to known bicycle racks.

SUMMARY

In accordance with the present disclosure, there is provided a bicycle rack for a vehicle, the bicycle rack comprising:
- a pair of elongate sliding members, each sliding member configured to be slidably connected to a roof of the vehicle, or to a respective roof connector of the vehicle, such that the sliding members are positioned in parallel and displaceable along a length of vehicle, wherein each sliding member has a bicycle receiving end region which is provided with a fastening element for removably fastening a bicycle to the bicycle rack:
- connecting elements for slidably connecting the sliding members to the roof or the roof connectors of the vehicle:
- a pair of elongate, telescopic arms, each arm having a first end which is connected to a respective one of the sliding members, and wherein a rack securing element is provided at a second end of one or both of the arms; and
- at least one wheel supporting member, wherein the wheel supporting member has a first section which is pivotably connected to one of the sliding members and a second section defining a wheel support,
- wherein the bicycle rack is operatively adjustable, through displacement of the sliding members, the arms and the support member relative to the vehicle, between a reposed position and a bicycle carrying position, wherein, in the reposed position, substantially the entire length of each sliding member is positioned on top of the roof, the arms are retracted and the wheel supporting member is pivoted such that the arms and the wheel supporting member are located substantially in a plane defined by the sliding members, and wherein, in the bicycle carrying position, a section of each sliding member extends beyond the roof such that the bicycle receiving end regions are able to receive the bicycle, the arms are extended downwardly to permit the rack securing element/s to mate with an external surface of the vehicle below the roof, and the wheel supporting member is pivoted downwardly to allow the wheel support to support a wheel of the bicycle at a point below the roof.

The roof connectors may be a pair of parallel, spaced apart rails or bars secured to the roof.

The vehicle may be an automobile, e.g. a pickup truck or a car. The roof of the vehicle may be a roof of a vehicle canopy. In the case of rails, the rails may be spaced apart along the width of the vehicle. In the case of bars, the bars may be cross-bars which extend perpendicularly to the length of the vehicle and are spaced apart along its length.

In the reposed position, the bicycle rack is preferably clear of a rear storage compartment of the vehicle.

The sliding members may be tubes. The fastening elements may be mounting straps for strapping a frame and wheel of the bicycle to the tubes.

The connecting elements may be a set of guides. Each guide may include a clamping portion for clamping the guide to the rail or bar and a guiding section which slidably receives one of the sliding members.

Alternatively, the connecting elements may include suction cups instead of clamping portions. A plurality of suction cups may be mounted to each sliding member via suitable guiding sections for connecting the sliding members directly to the roof (as opposed to mounting them to the rails/bars).

The arms may be in the form of telescopic struts. The first end of each arm may be pivotably attached to the sliding member such that the arms can be pivoted and retracted into the reposed position. The arms are preferably lockable such that, in a locked condition, the length of the arm cannot be adjusted.

The second ends of the arms may be connected to each other, thereby connecting the sliding members such that they are displaced together, in use.

The external surface may be a rear door handle, e.g. a rear door handle of a vehicle canopy. Both of the arms may thus be secured against the rear door handle.

The rack securing element may be a suction cup configured to secure the arms to the external surface of the vehicle.

The second section of the wheel supporting member may be an elbow-shaped tube. The first section may be a T-piece which is pivotably connected to the sliding member. The second section of the wheel supporting member may be removable from the first section, e.g. by way of a releasable clamp.

The fastening elements and the wheel supports may be in the form of wheel wells with straps.

In some embodiments, the bicycle rack may be configured to receive two bicycles, in which case each sliding member may be fitted with a wheel supporting member for supporting a front wheel of each bicycle, and/or each sliding member may include two fastening elements spaced apart along the length of the sliding member.

In use, the second section of a front one of the wheel supporting members (further to the rear of the vehicle) may be removed to allow a first bicycle to be mounted to a rear one of the wheel supporting members (closest to the vehicle), after which the second section of the front wheel supporting member can be re-attached to permit mounting of a second bicycle.

The present disclosure extends to a kit which includes the following components for assembly of a bicycle rack, as described above: the sliding members, the connecting elements, the telescoping arms, and the at least one wheel supporting member.

Aspects of the subject matter described herein may be useful alone or in combination with one or more other aspects described herein. In a 1st exemplary aspect of the present disclosure, a bicycle rack includes at least two elongated sliding members having a bicycle receiving end region with a fastening element. The at least two elongated sliding members are configured to be connected to a vehicle roof.

In a 2nd exemplary aspect of the present disclosure, which may be used in combination with any one or more of the preceding aspects (e.g., the 1st aspect), the at least two elongated sliding members further include a connecting element for slideably connecting the at least two elongated sliding members to the vehicle roof.

In a 3rd exemplary aspect of the present disclosure, which may be used in combination with any one or more of the preceding aspects (e.g., the 2nd aspect), the connecting element is a guide having a clamping portion.

In a 4th exemplary aspect of the present disclosure, which may be used in combination with any one or more of the preceding aspects (e.g., the 2nd aspect), the connecting element is a suction cup.

In a 5th exemplary aspect of the present disclosure, which may be used in combination with any one or more of the preceding aspects (e.g., the 1st aspect), the fastening element is a strap.

In a 6th exemplary aspect of the present disclosure, which may be used in combination with any one or more of the preceding aspects (e.g., the 1st aspect), the bicycle rack further includes a wheel supporting member having a first section pivotably connecting the wheel supporting member to the at least two elongated sliding members and a second section defining a wheel support.

In a 7th exemplary aspect of the present disclosure, which may be used in combination with any one or more of the preceding aspects (e.g., the 6th aspect), the second section defining the wheel support is removably connected to the first section.

In an 8th exemplary aspect of the present disclosure, which may be used in combination with any one or more of the preceding aspects (e.g., the 1st aspect), the bicycle rack further includes at least two arms having a first end pivotably connected to the at least two elongated sliding members and a rack securing element on a second end.

In a 9th exemplary aspect of the present disclosure, which may be used in combination with any one or more of the preceding aspects (e.g., the 8th aspect), the at least two arms include a retracted position and a bicycle carrying position.

In a 10th exemplary aspect of the present disclosure, which may be used in combination with any one or more of the preceding aspects (e.g., the 9th aspect), the at least two arms are located in a plane defined by the at least two elongated sliding members in the retracted position.

In an 11th exemplary aspect of the present disclosure, which may be used in combination with any one or more of the preceding aspects (e.g., the 9th aspect), the at least two arms extend below the vehicle roof in the bicycle carrying position.

In a 12th exemplary aspect of the present disclosure, which may be used in combination with any one or more of the preceding aspects (e.g., the 9th aspect), the at least two arms are telescopic.

In a 13th exemplary aspect of the present disclosure, which may be used in combination with any one or more of the preceding aspects (e.g., the 9th aspect), the at least two arms include a locked and an unlocked position.

In a 14th exemplary aspect of the present disclosure, which may be used in combination with any one or more of the preceding aspects (e.g., the 9th aspect), the rack securing element is configured to engage a surface located below the vehicle roof.

In a 15th exemplary aspect of the present disclosure, which may be used in combination with any one or more of the preceding aspects (e.g., the 14th aspect), the rack securing element engages a rear door handle.

Aspects of the subject matter described herein may be useful alone or in combination with one or more other aspects described herein. In a 16th exemplary aspect of the present disclosure, a bicycle rack includes a pair of elongated sliding members, each having a first end and a second end. The pair of elongated sliding members are configured to be connected to a vehicle roof and the first end of each pair of elongated sliding members are pivotably connected to a respective arm of a pair of arms. The pair of arms are configured to telescope between a retracted position and a bicycle carrying position.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The present disclosure further extends to a canopy for a vehicle which includes a bicycle rack as described above.

BRIEF DESCRIPTION OF THE FIGURES

The present disclosure will now be further described, by way of example, with reference to the accompanying drawings.

In the drawings.

DETAILED DESCRIPTION OF EXAMPLE EMBODIMENTS

Figure 1:
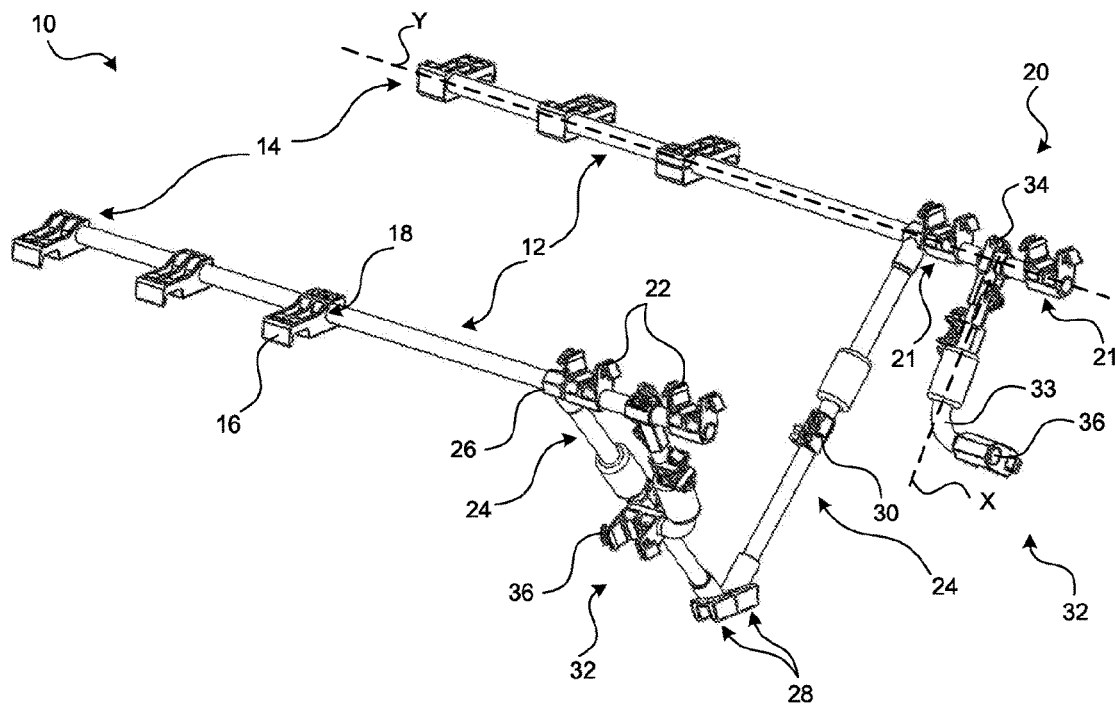
FIG. 1 is a perspective view of a first embodiment of a bicycle rack according to the present disclosure ("first bicycle rack"), shown in a bicycle carrying position.
Figure 2:
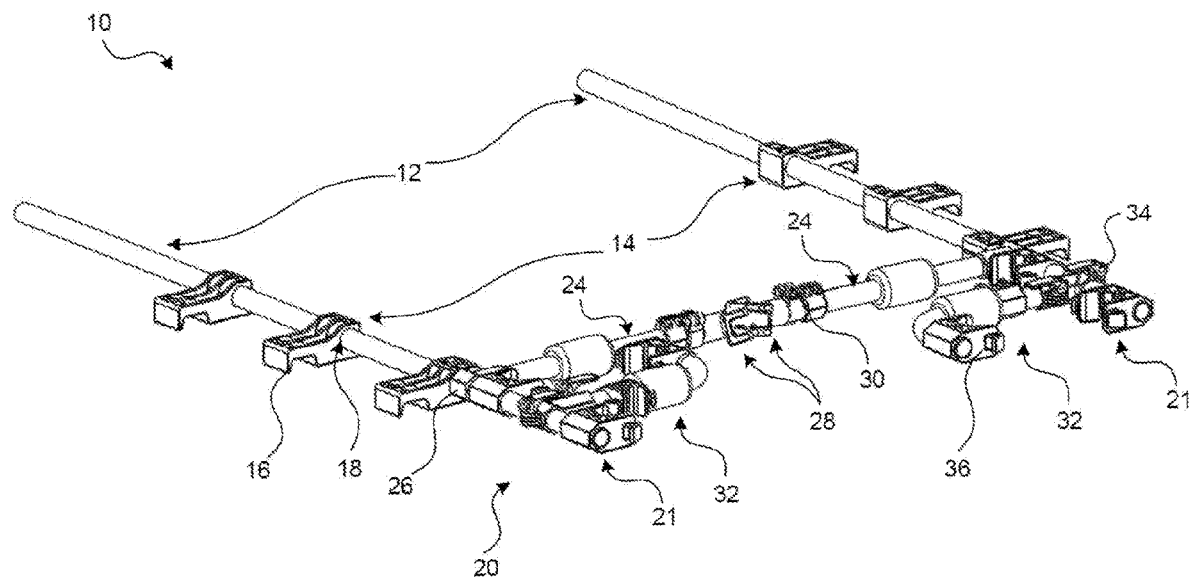
FIG. 2 is a perspective view of the first bicycle rack, shown in a reposed position.
Figure 3:
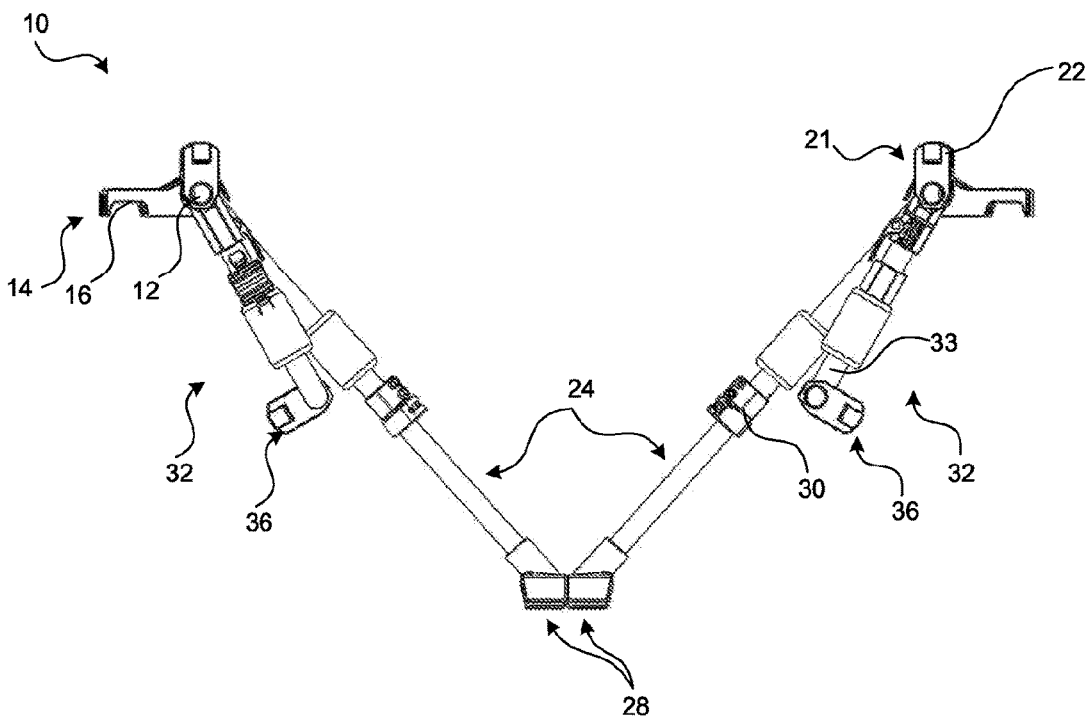
FIG. 3 is a front view of the first bicycle rack in the bicycle carrying position.
Figure 4:
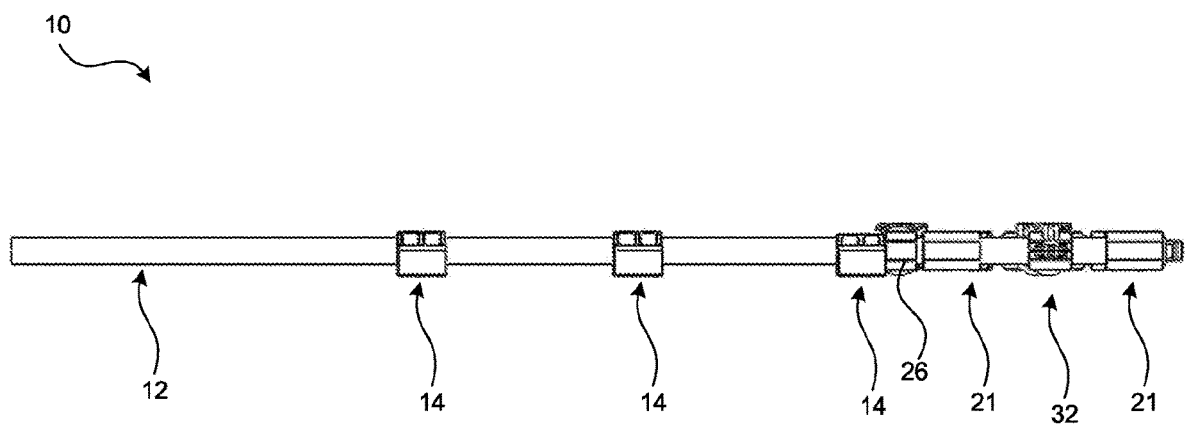
FIG. 4 is a side view of the first bicycle rack in the reposed position.

The following description is provided as an enabling teaching of the present disclosure, is illustrative of principles associated with the present disclosure and is not intended to limit the scope. Changes may be made to the embodiments depicted and described, while still attaining results of the present disclosure and/or without departing from the scope of the present disclosure. Furthermore, it will be understood that some results or advantages of the present disclosure may be attained by selecting some of the features of the present disclosure without utilizing other features. Accordingly, those skilled in the art will recognize that modifications and adaptations to the present disclosure may be possible and may even be desirable in certain circumstances, and may form part of the present disclosure.

In an example embodiment, a bicycle rack (hereafter "the rack 10") according to the present disclosure is shown. The rack 10 is configured to be attached to a roof of an automobile and to mount at least one bicycle behind the automobile (or at the side thereof, depending on the implementation). The rack 10 is adjustable between a reposed/stowed position and a bicycle carrying position. More specifically, the assembly as shown in the drawings can be retracted when not in use and stored on top of the roof, thereby accommodating and not impeding doors of the vehicle (e.g. the rear door) used to access its storage compartment.

In an example embodiment shown in FIGS. 1 to 23 of the drawings, the rack 10 includes a pair of elongate sliding members in the form of tubes 12. Each sliding tube 12 is configured to be connected to a component on a roof of a vehicle or vehicle canopy. In an example, this component may be a roof rail or a roof bar (cross-bar).

The rack 10 further includes a set of guides 14. In a number of embodiments, three guides 14 are used to mount each tube 12, by spacing the guides 14 along the length of the vehicle and securing them to the rail/bar. Each guide 14 may comprise two portions allowing it to fulfill two functions. More specifically, each guide may comprise a clamping portion defining a clamp 16 at one end thereof and a guiding section defining a guide slot 18 at the other end thereof. Each tube 12 is slidably inserted through the slots 18 of three of the guides 14 and the clamps 16 of those guides are then used to mount the tube 12 to a rail, cross-bar, or the like, such that the tube 12 can slide in parallel with and relative to the rail, cross-bar, or the like.

Each sliding tube 12 has, at a bicycle receiving end region 20 thereof, two fastening elements in the form of so-called "wheel wells" 21 with mounting straps 22. The wells 21 and mounting straps 22 are spaced apart along the length of the tube 12 to accommodate two bicycles along its length.

Figure 5:
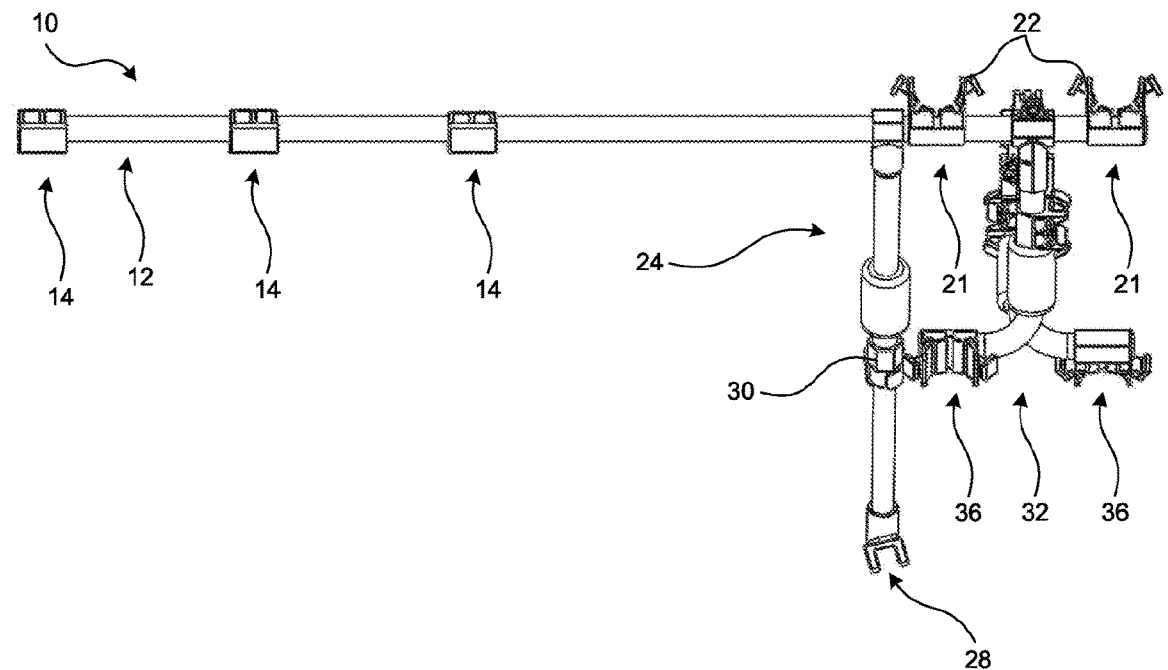
FIG. 5 is a side view of the first bicycle rack in the bicycle carrying position.
Figure 6:
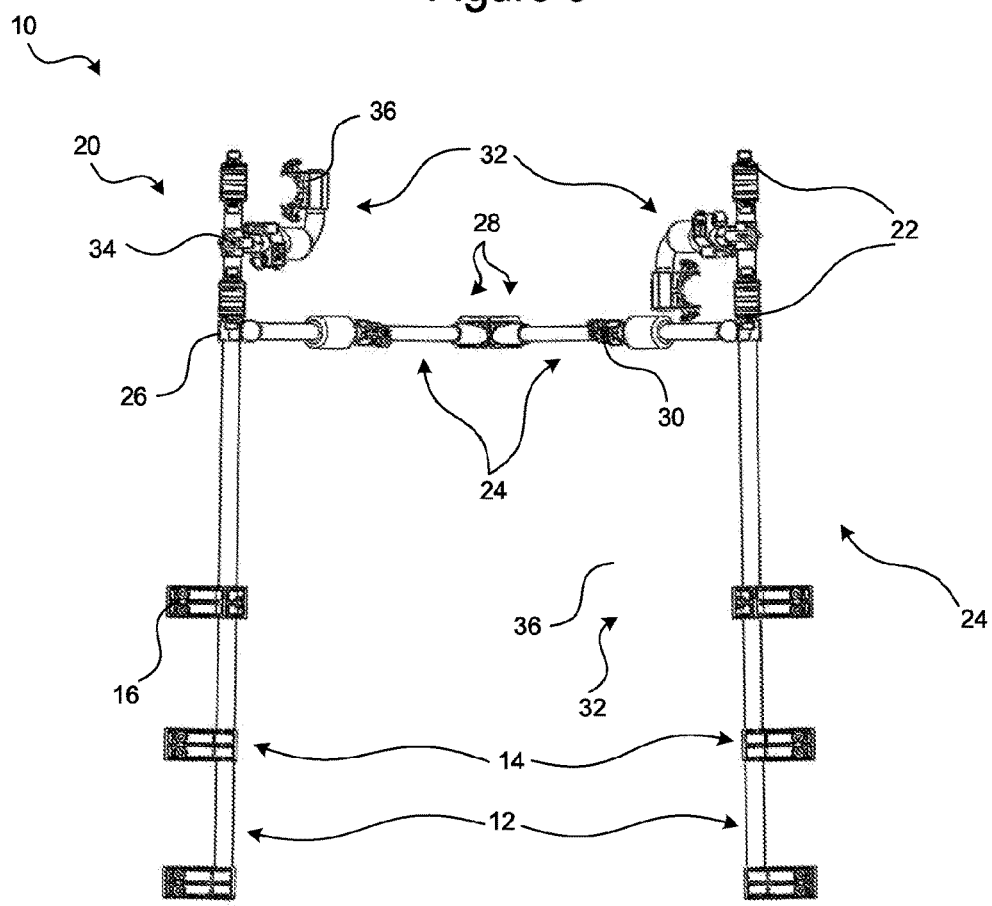
FIG. 6 is a top view of the first bicycle rack in the bicycle carrying position.
Figure 7:
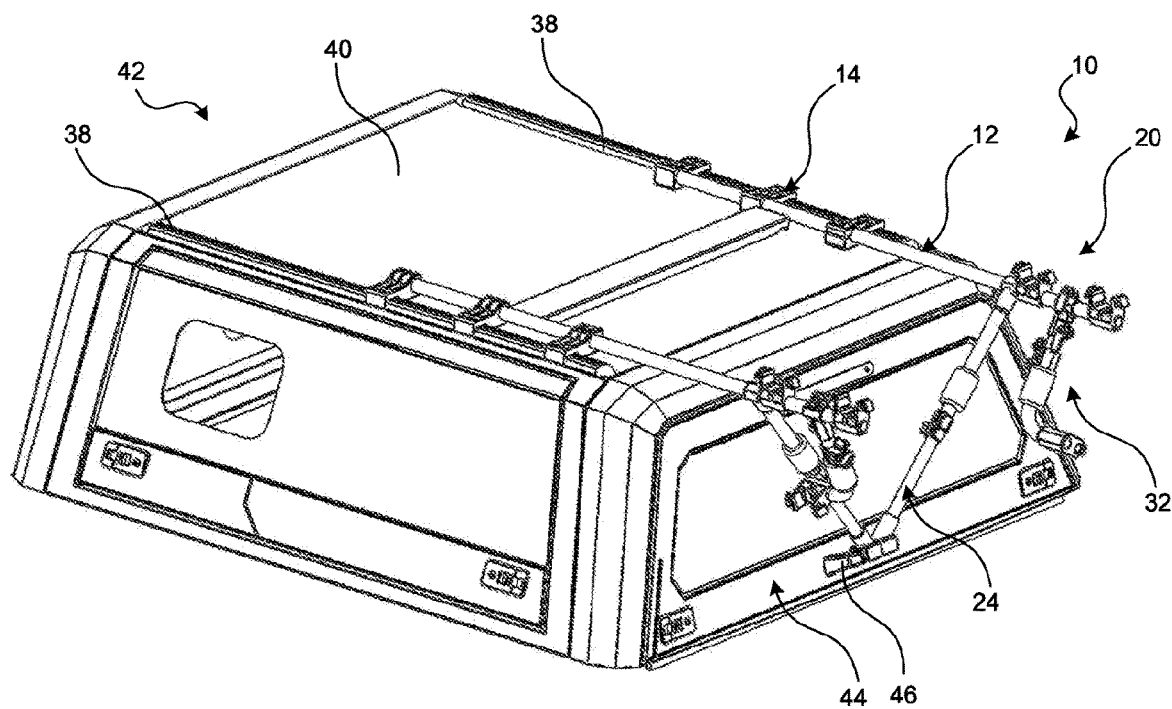
FIG. 7 is a perspective view of the first bicycle rack in use, installed on a vehicle canopy by means of attachment to roof rails of the vehicle canopy, and shown in the bicycle carrying position.
Figure 8:
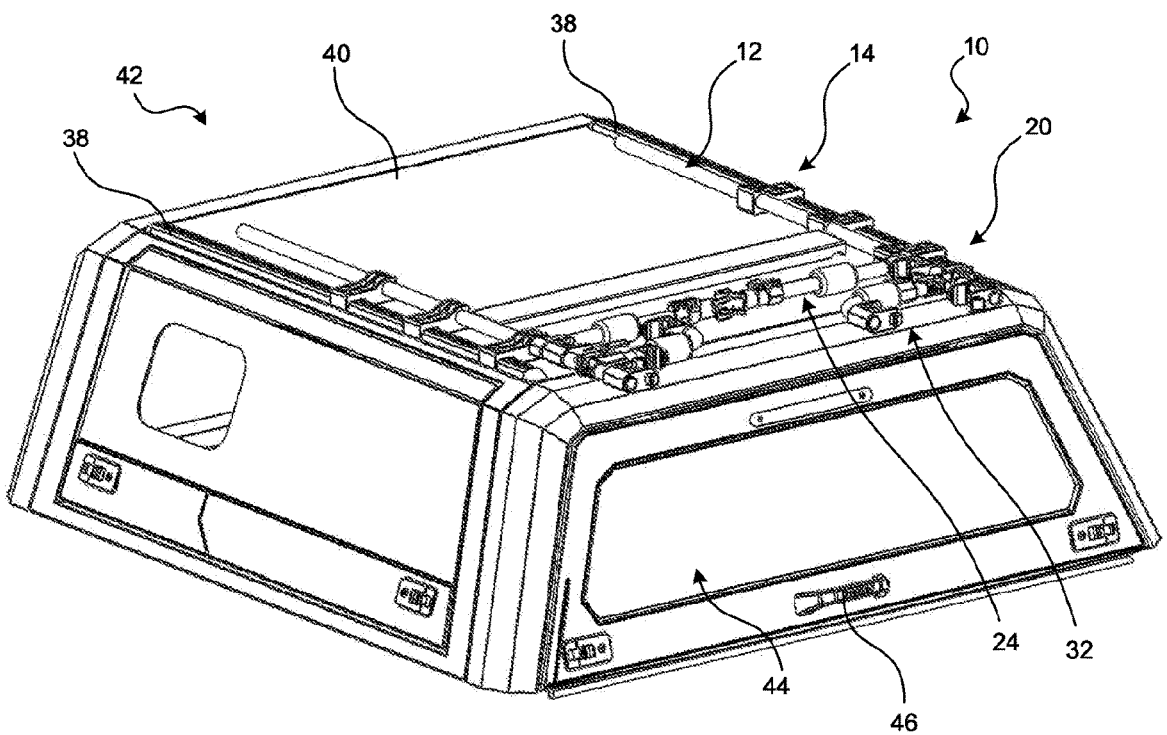
FIG. 8 is a perspective view of the first bicycle rack in use, shown in the reposed position.
Figure 9:
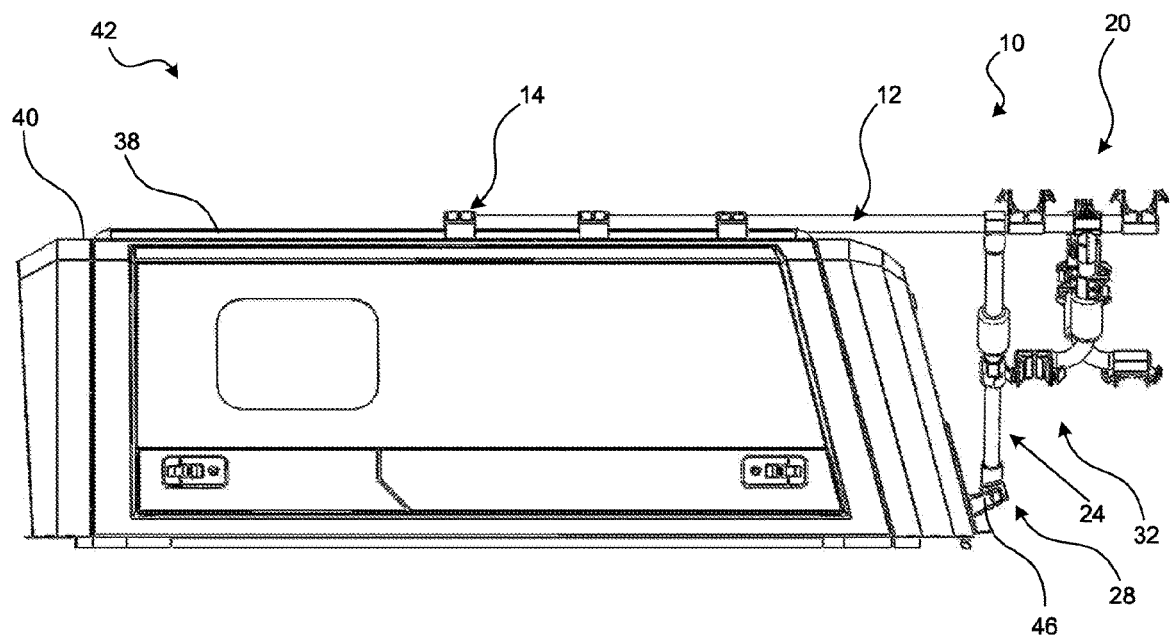
FIG. 9 is a side view of the first bicycle rack in use, in the reposed position.
Figure 10:
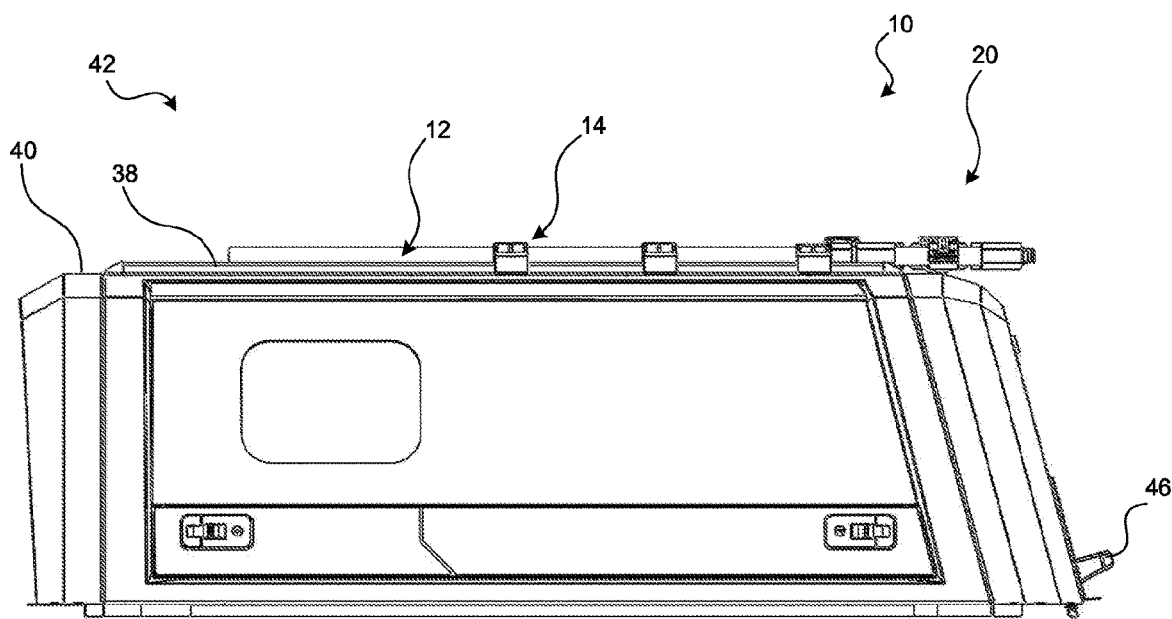
FIG. 10 is a side view of the first bicycle rack in use, in the bicycle carrying position.
Figure 11:
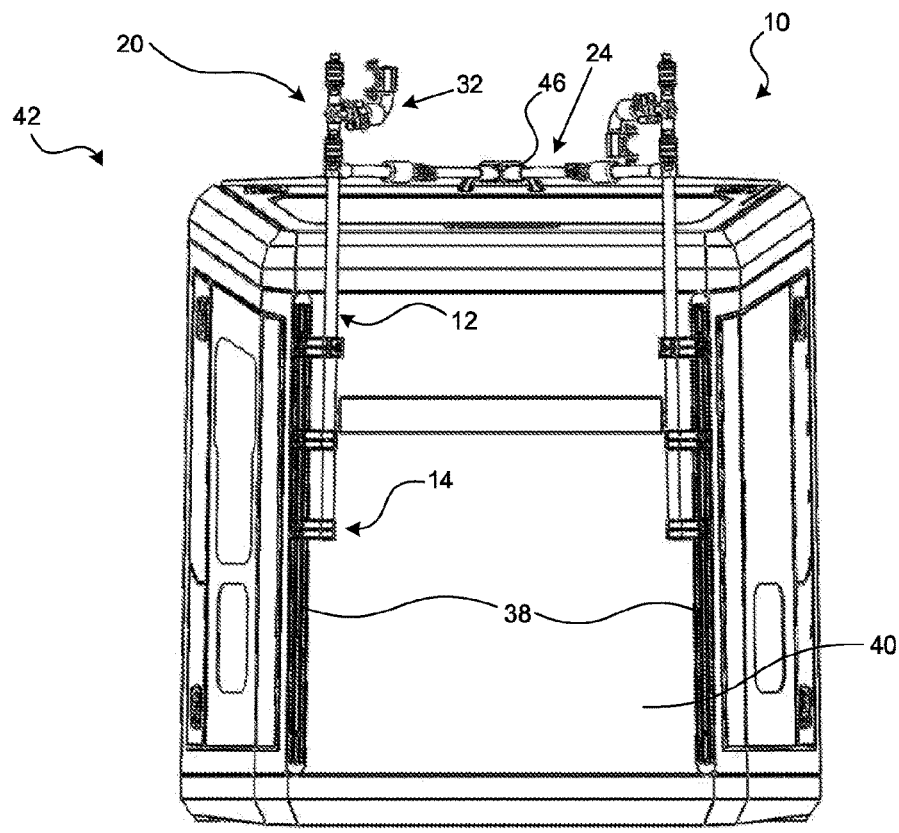
FIG. 11 is a top view of the first bicycle rack in use, in the bicycle carrying position.
Figure 12:
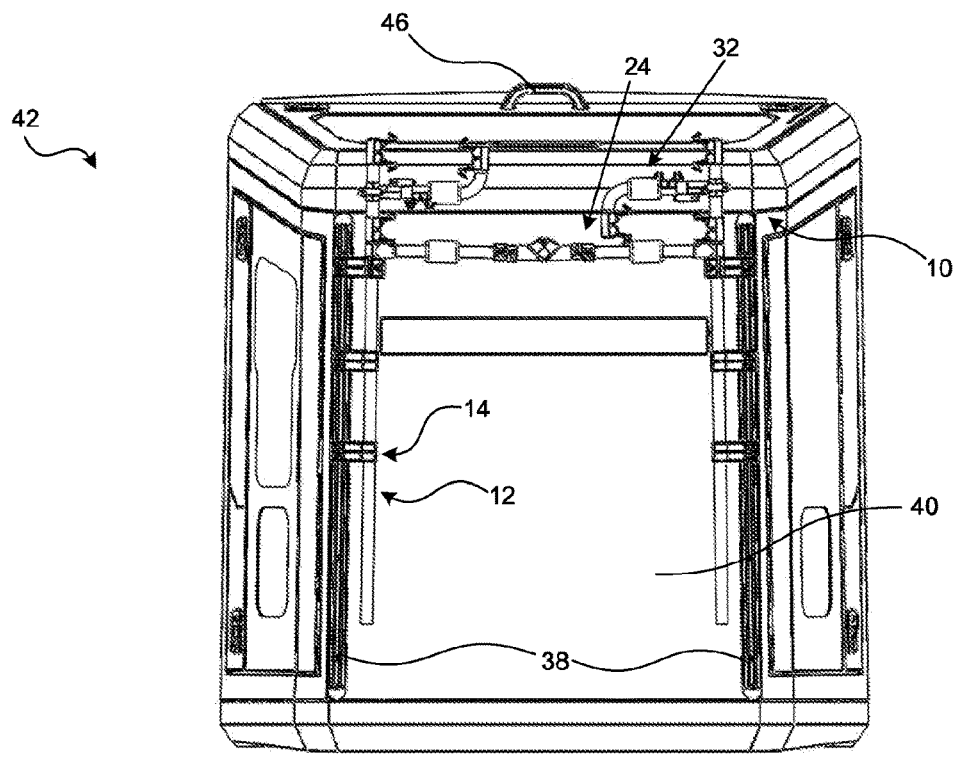
FIG. 12 is a top view of the first bicycle rack in use, in the reposed position.
Figure 13:
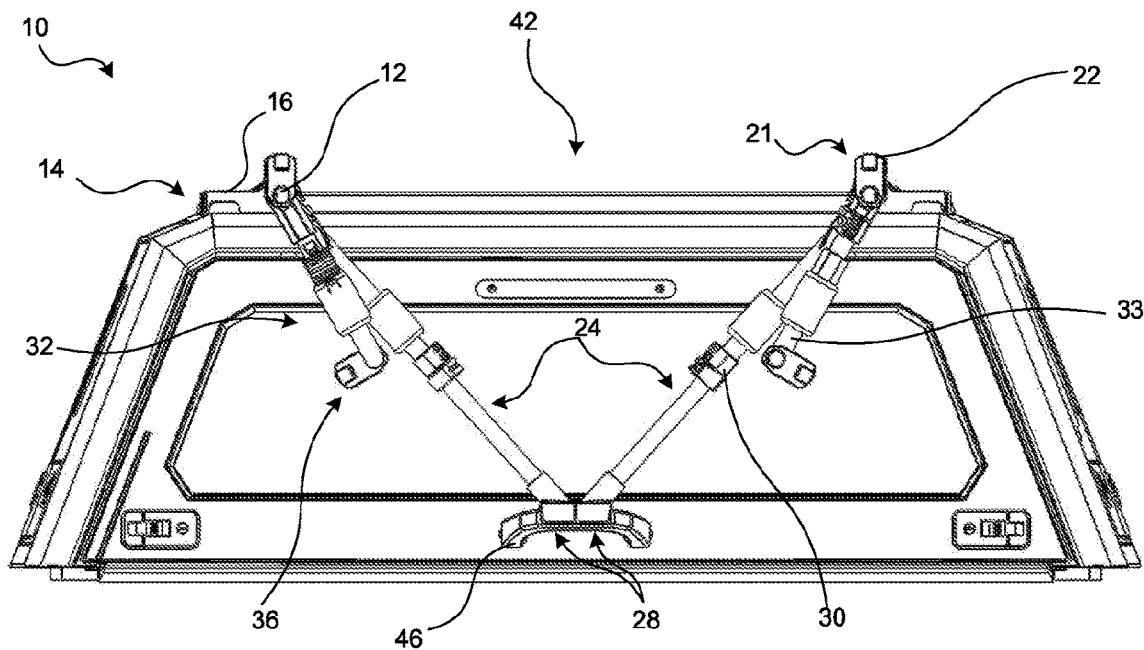
FIG. 13 is a front view of the first bicycle rack in use, showing a rear of the vehicle canopy and showing the bicycle rack in the bicycle carrying position.
Figure 14:
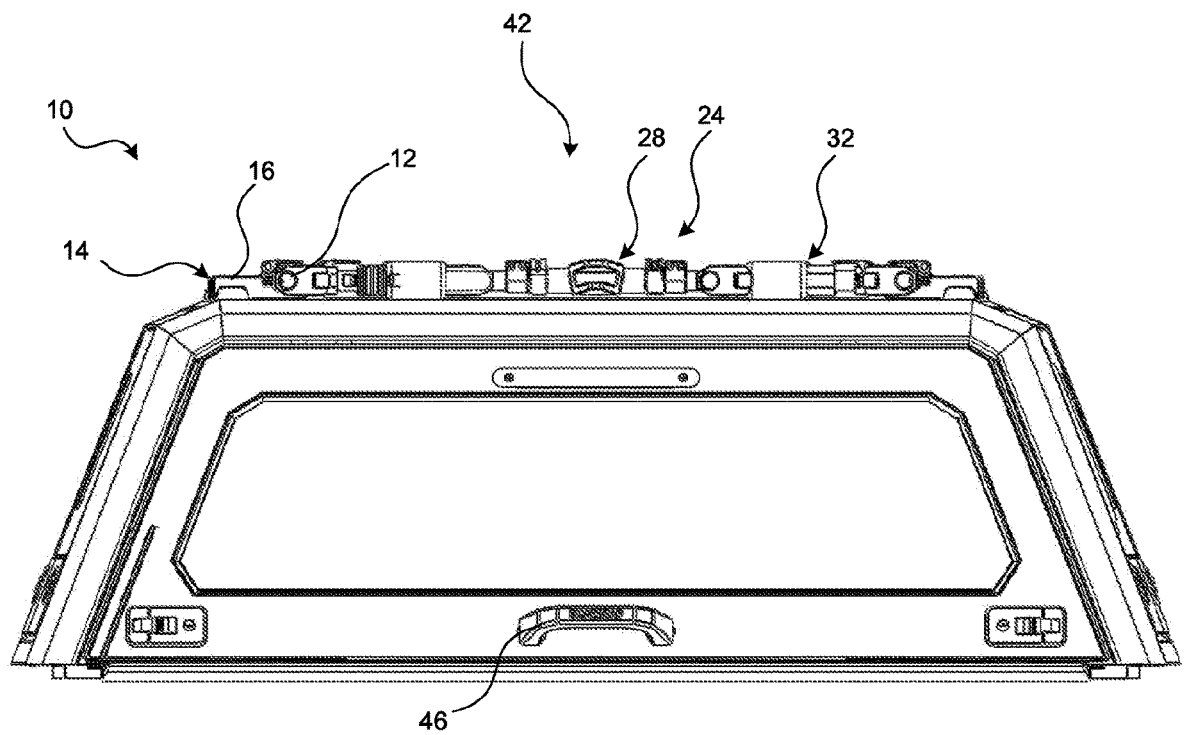
FIG. 14 is a front view of the first bicycle rack in use, showing the rear of the vehicle canopy and showing the bicycle rack in the reposed position.

The rack 10 further includes a pair of telescopic arms 24, or struts. Each arm 24 has a first end which is pivotably connected to a respective one of the sliding tubes 12 via a connector 26. In an example, each arm 24 is fixed in position along the length of the tube 12, but is pivotable about the lengthwise axis of the tube 12. Each arm 24 has a second end which defines a rack securing element 28. The rack securing elements 28 terminate in U-shaped formations, as shown in FIG. 5.

Figure 33:
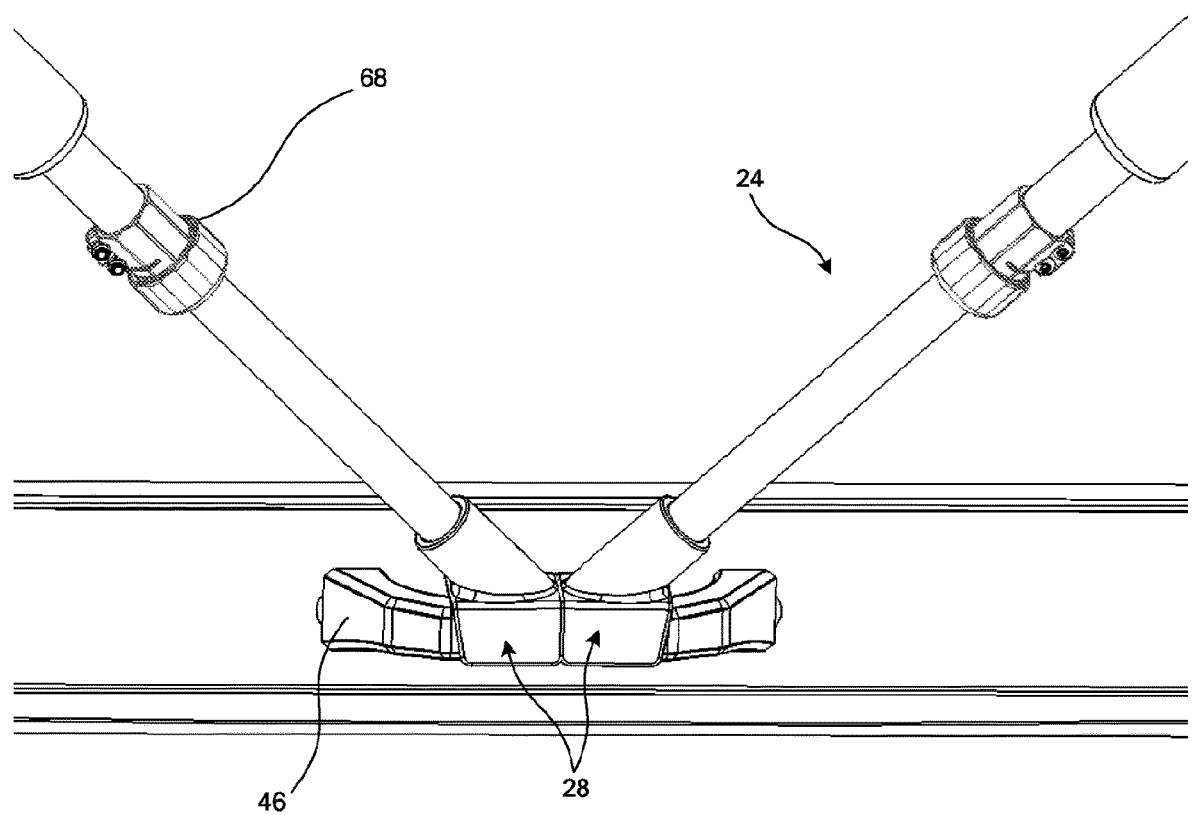
FIG. 33 is a perspective view of end regions of telescopic arms of the first bicycle rack, showing securing elements of the bicycle rack connected to a rear door handle of the vehicle canopy.

Locking elements 30 are provided along the length of each arm 24, allowing the arm 24 to be adjusted between an unlocked condition in which it is telescopic, i.e. it can be extended and retracted, and a locking condition in which its length cannot be adjusted. In many embodiments, locking elements 30 are cam lever clamps as shown, for example, in FIG. 15. In various embodiments, locking elements 68 are collet-type clamps as shown in FIG. 33.

Each sliding tube 12 may further include a wheel supporting member 32. The member 32 is pivotably connected to the sliding tube 12 by way of a first section which is in the form of a T-piece 34 at a first end of the member 32. The member 32 has a second section in the form of an elbow-shaped tube 33.

As with the arms 24, the members 32 are fixed along the length of the tubes 12, but pivotable about the lengthwise axis of each respective tube 12.

Furthermore, the member 32 is articulated such that the second section 33 thereof can be rotated about an axis 'X' that is perpendicular to the lengthwise axis 'Y' of the tubes 12 (see FIG. 1 which shows the axes). The second section 33 can also be removed from the first T-piece 34 as will be described in more detail below.

A second end of the member 32, i.e. the end of the second section 33, is shaped to support a wheel of a bicycle, in use, and terminates in wheel well with a mounting strap 36.

In an example, on each tube 12, the arm 24, the mounting straps 22 and the wheel supporting member 32 are arranged in the following order along the length of the tube 12, in the bicycle receiving end region 20 thereof: arm 24 (being closest to the guides 14), one of the straps 22, member 32, and then the other strap 22 (being the furthest from the guides 14).

Referring now to FIGS. 7 to 23, in use, in one fitment option, the rack 10 can be installed by connecting the sliding tubes 12 to the roof rails 38 on the roof 40 of a vehicle canopy 42 via the guides 14. The guides 14 are clamped to the roof rails 38 such that the slots 18 of the guides 14 are positioned inside, i.e. towards the center of the roof 40. Accordingly, the tubes 12 are spaced apart and oriented in parallel with the roof rails 38, and can be slid along the length of the tubes 12 between the reposed position and the bicycle carrying position.

In the reposed position, the tubes 12 are displaced (slid or pushed in the direction of a front of the vehicle canopy) such that substantially the entire length of each tube 12 is positioned on top of the roof 40. The guide 14 closest to the region 20 limits displacement of the tubes 12 as the connector 26 cannot fit through the slot 18 (shown in FIG. 2).

Furthermore, the arms 24 are pivoted upwardly and retracted such that they lie in the same plane as the tubes 12 and extend perpendicularly to the tubes 12 across the width of the roof 40, with the rack securing elements 28 meeting each other in the middle of the roof 40 (along its width). Similarly, the wheel supporting member 32 are pivoted upwardly and suitably adjusted such that they are located in the same plane as the tubes 12.

As a result, in the reposed position, the rack 10 can be safely and securely stowed on top of the roof 40 when the rack 10 is not carrying bicycles and the vehicle canopy 42 can be used in the normal way, e.g. its rear door 44 can be opened without the rack 10 impeding access to the internal storage area of the canopy 42. Further, the reposed rack 10 is very low profile which may have added benefits, e.g. a roof rack may be installed on the roof rails 38 with the rack 10 being stored below the roof rack.

To move the rack 10 into the bicycle carrying position, the sliding tubes 12 are pulled/slid out in the direction of the rear of the canopy 42 such that a section of each sliding tube 12 extends beyond the roof 40. In this way, the bicycle receiving end regions 20 are clear of the roof 40 and able to receive one or more bicycle. In an example, and as shown in FIGS. 16 to 19, a bicycle 43 is mounted such that a part of its frame 45 or a wheel rests on each tube 12 and a pair of corresponding straps 22 on the tubes 12, i.e. those that are aligned lengthwise, are strapped to those parts of the bicycle received in the wells 21 to secure it in position. In another example shown in the drawings, a rear wheel 49 rests on one of the tubes 12 and a part of the frame 45 rests on the other tube 12.

Figure 15:
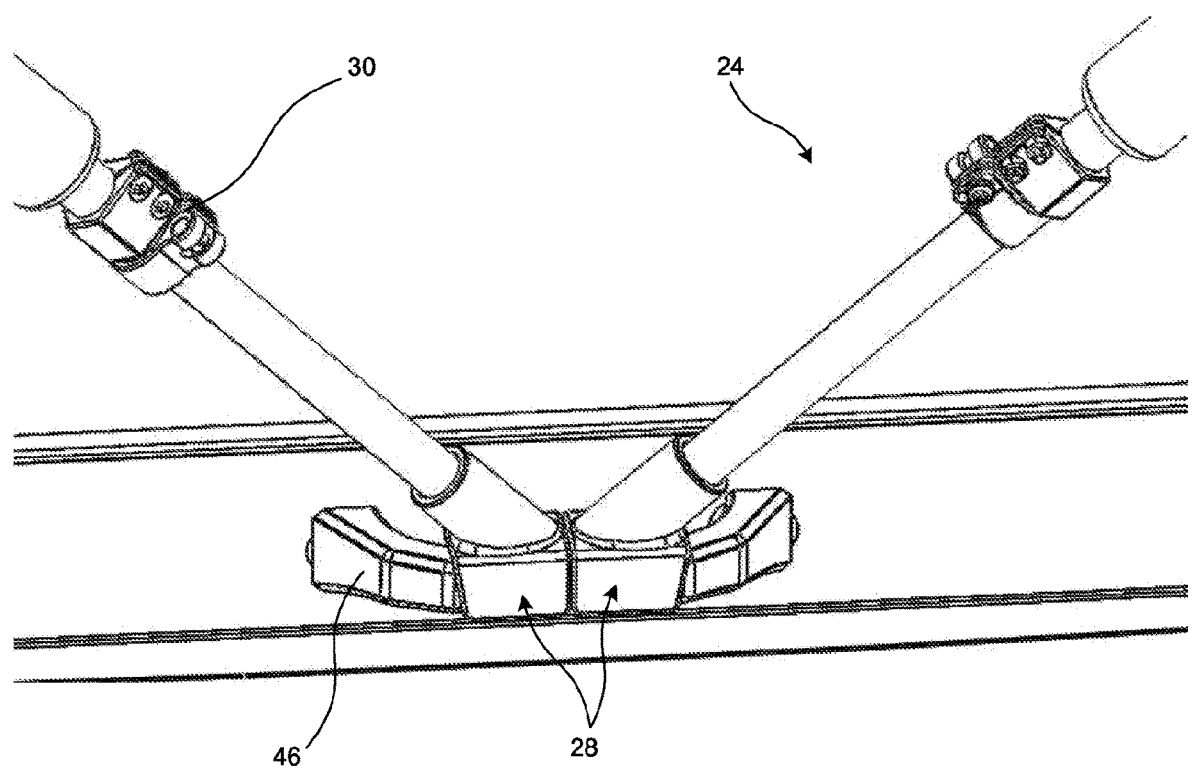
FIG. 15 is a perspective view of end regions of telescopic arms of the first bicycle rack, showing securing elements of the bicycle rack connected to a rear door handle of the vehicle canopy.
Figure 16:
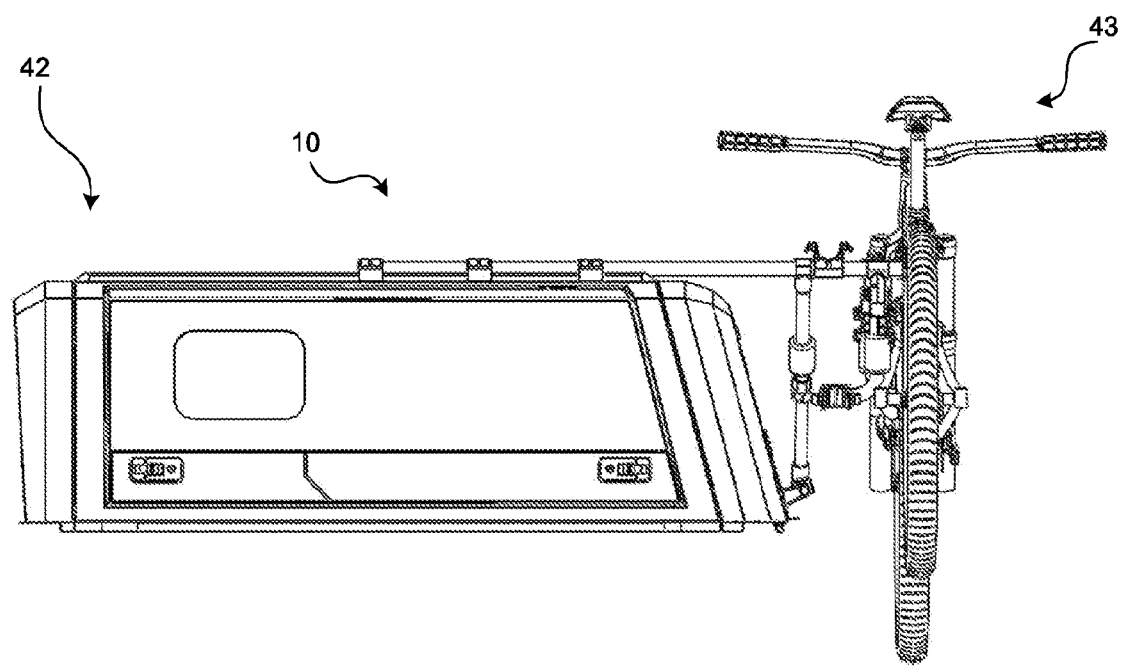
FIG. 16 is a side view of the first bicycle rack in use, in the bicycle carrying position and carrying a bicycle.
Figure 17:
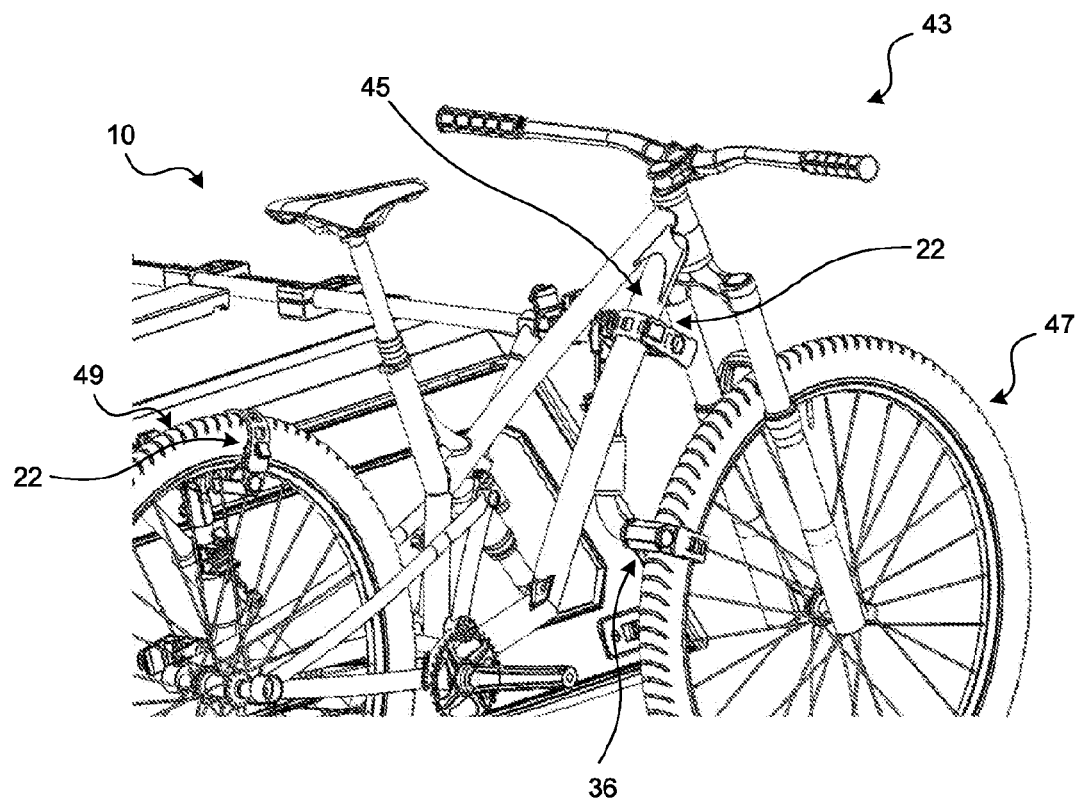
FIG. 17 is a partial perspective view further illustrating the mounting of the bicycle of FIG. 16.
Figure 18:
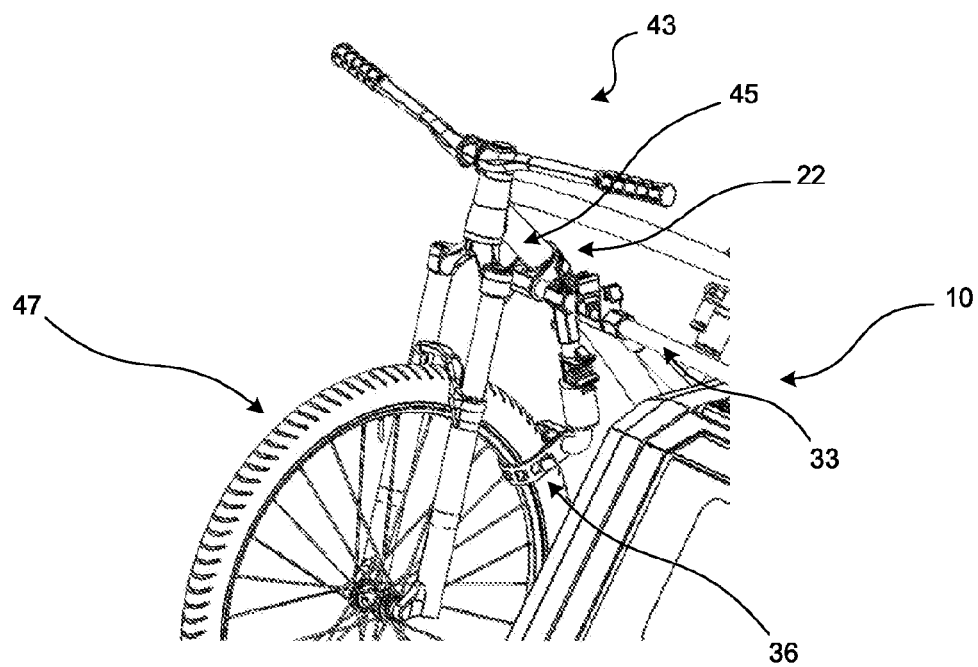
FIG. 18 is a partial perspective view further illustrating the mounting of the bicycle of FIG. 16.
Figure 19:
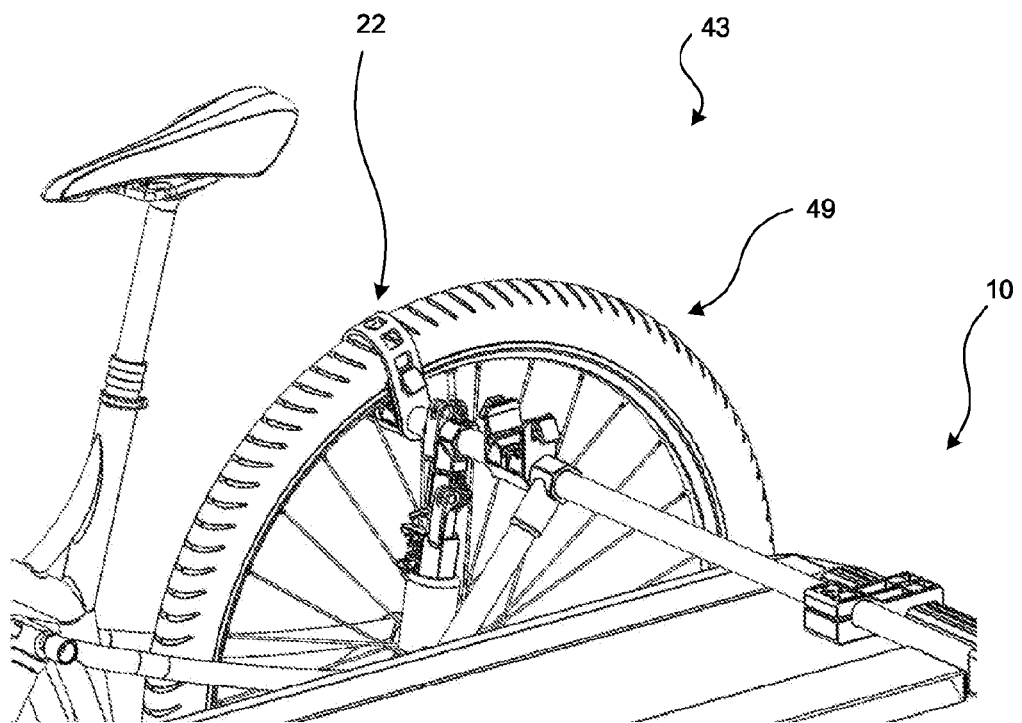
FIG. 19 is a partial perspective view further illustrating the mounting of the bicycle of FIG. 16.
Figure 20:
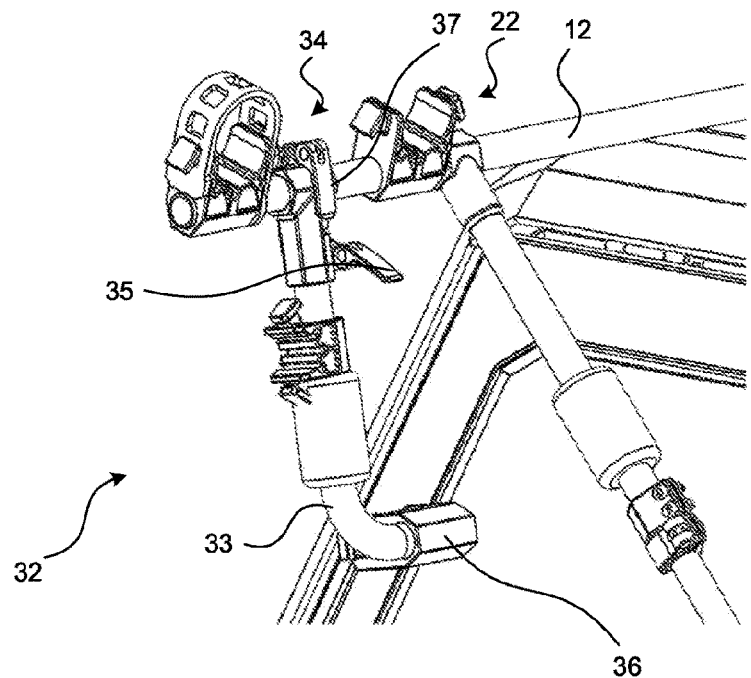
FIGS. 20-23 are partial perspective views illustrating a series of steps carried out to remove a second section of a front wheel supporting member of the first bicycle rack so as to allow a first of two bicycles to be mounted to the bicycle rack.
Figure 21:
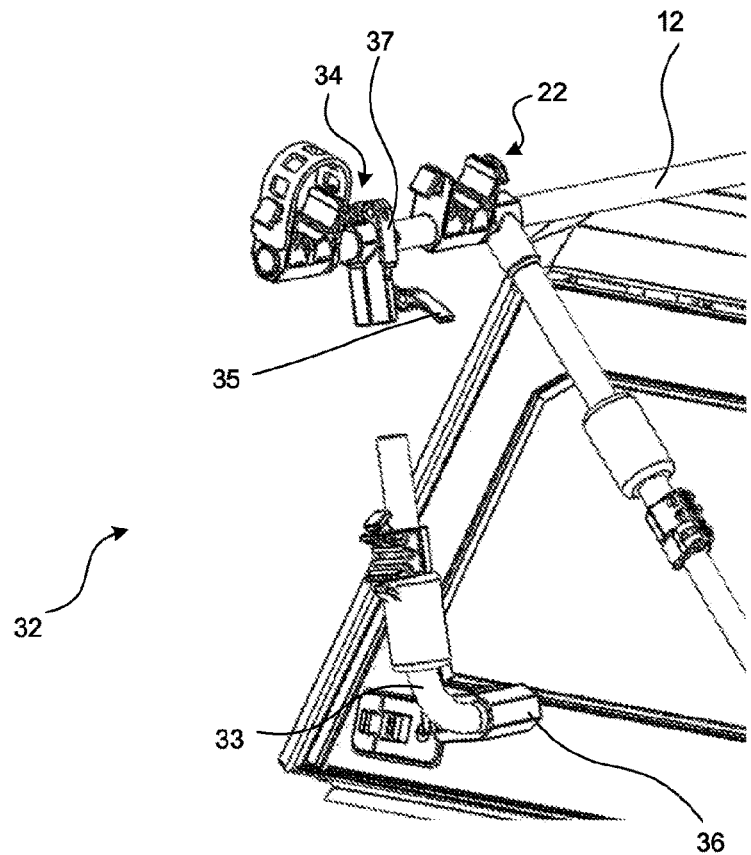
Figure 22:
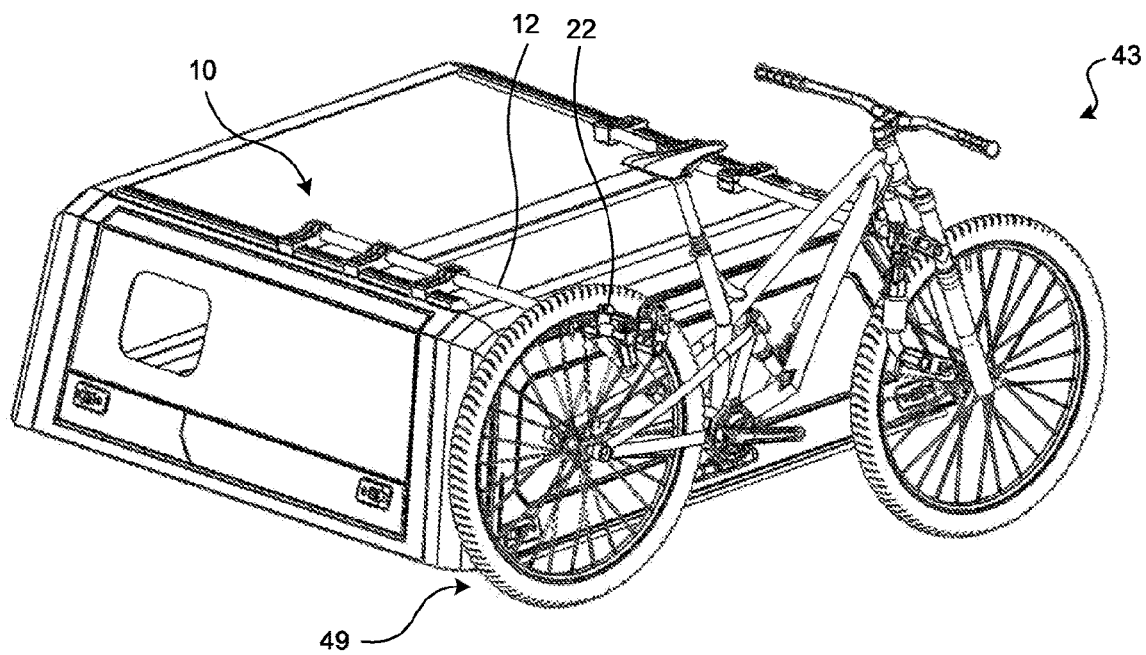
Figure 23:
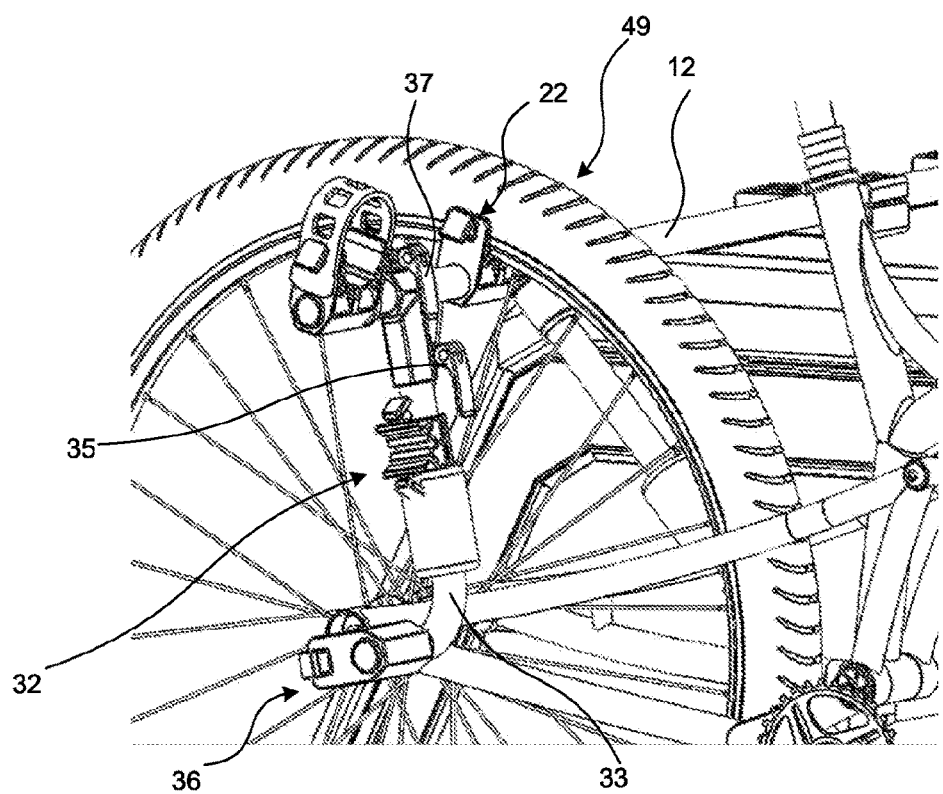
Figure 24:
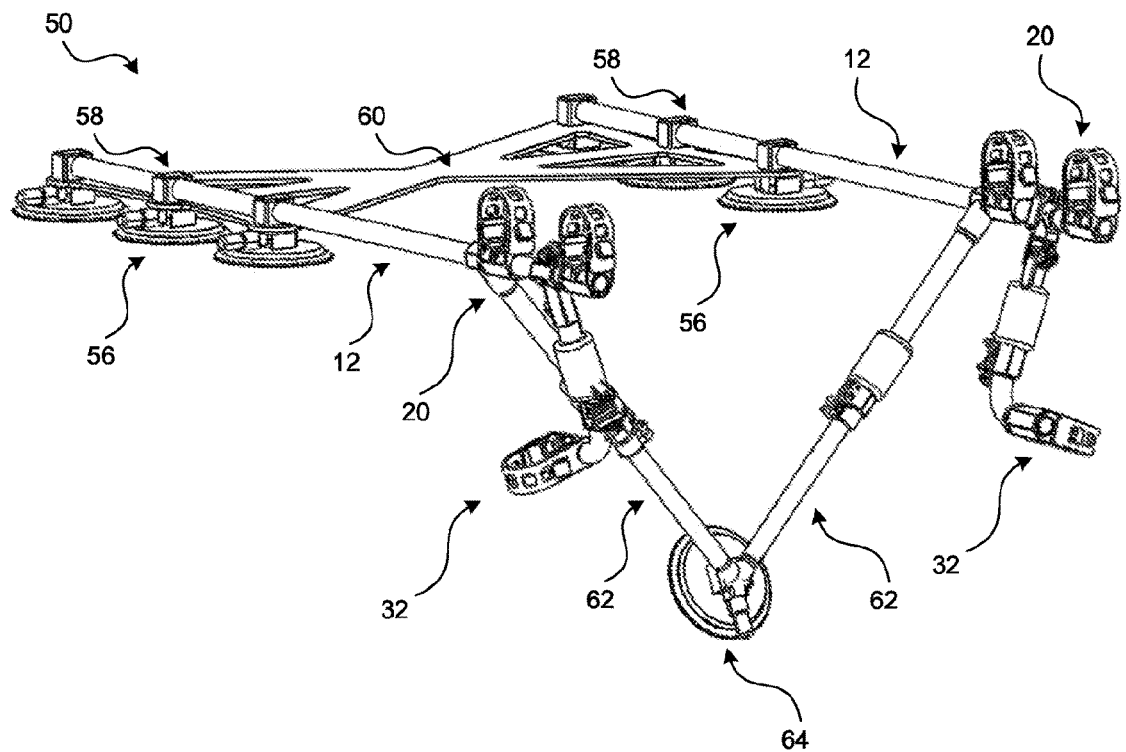
FIG. 24 is a perspective view of a second embodiment of a bicycle rack according to the present disclosure ("second bicycle rack"), shown in a bicycle carrying position.
Figure 25:
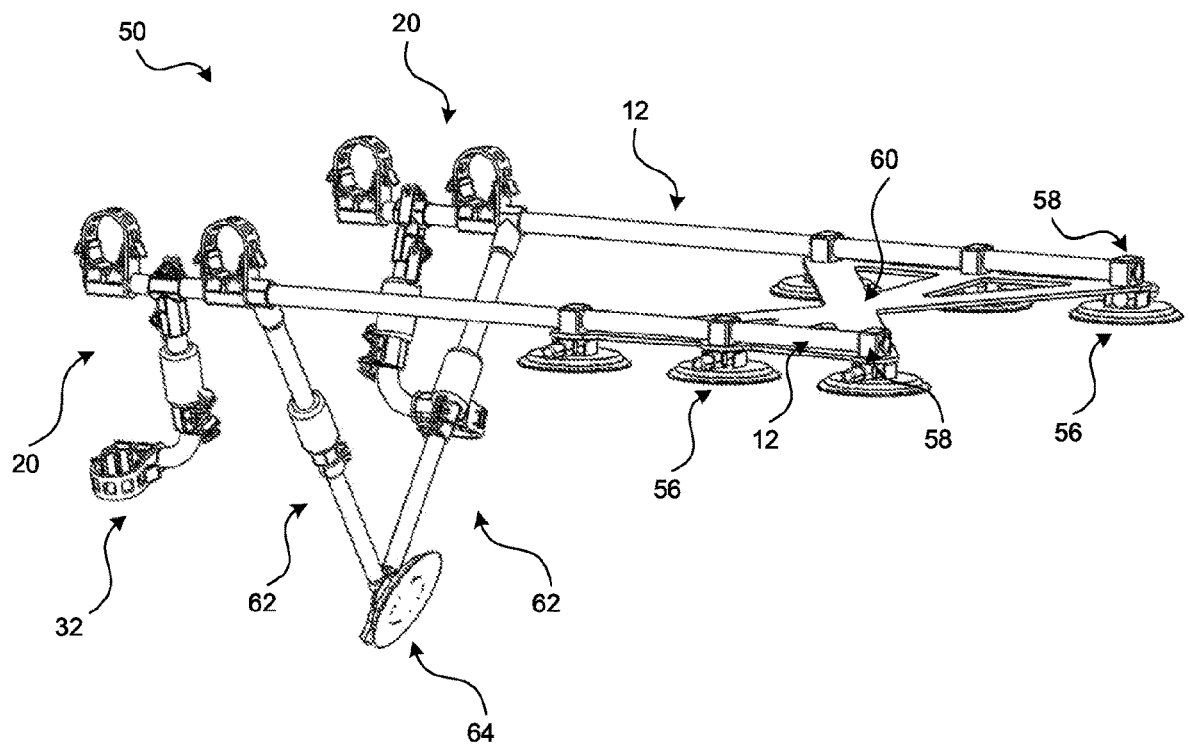
FIG. 25 is another perspective view of the second bicycle rack in the bicycle carrying position.
Figure 26:
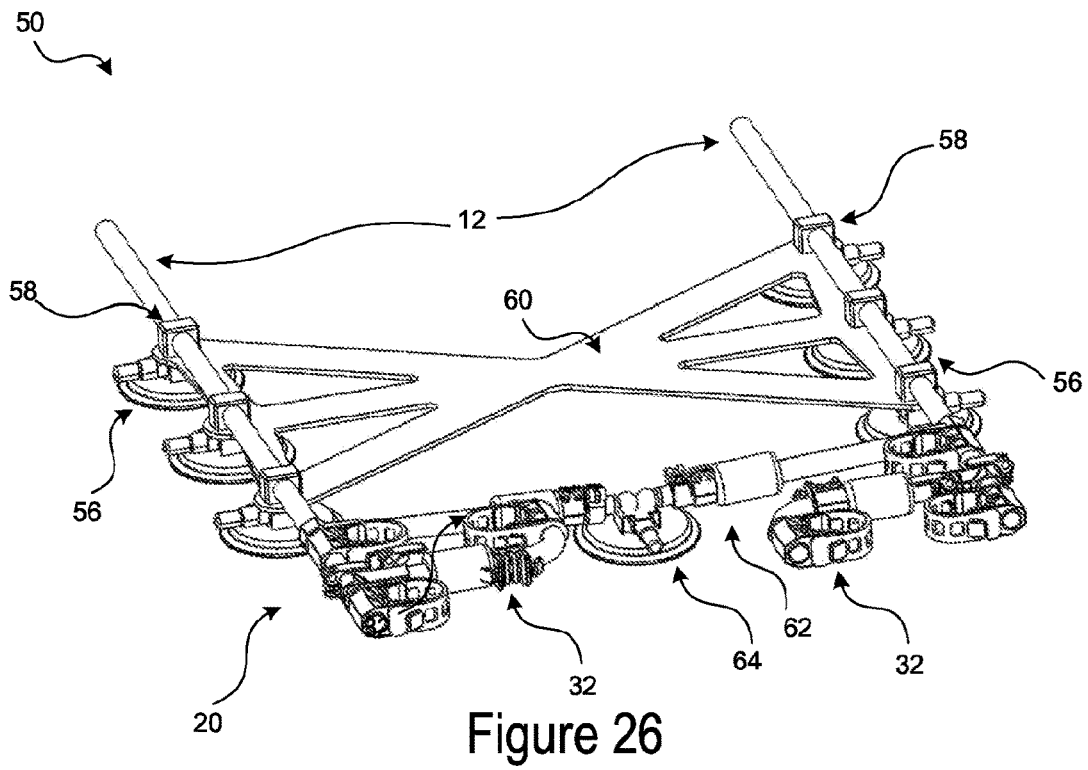
FIG. 26 is a perspective view of the second bicycle rack in a reposed position.
Figure 27:
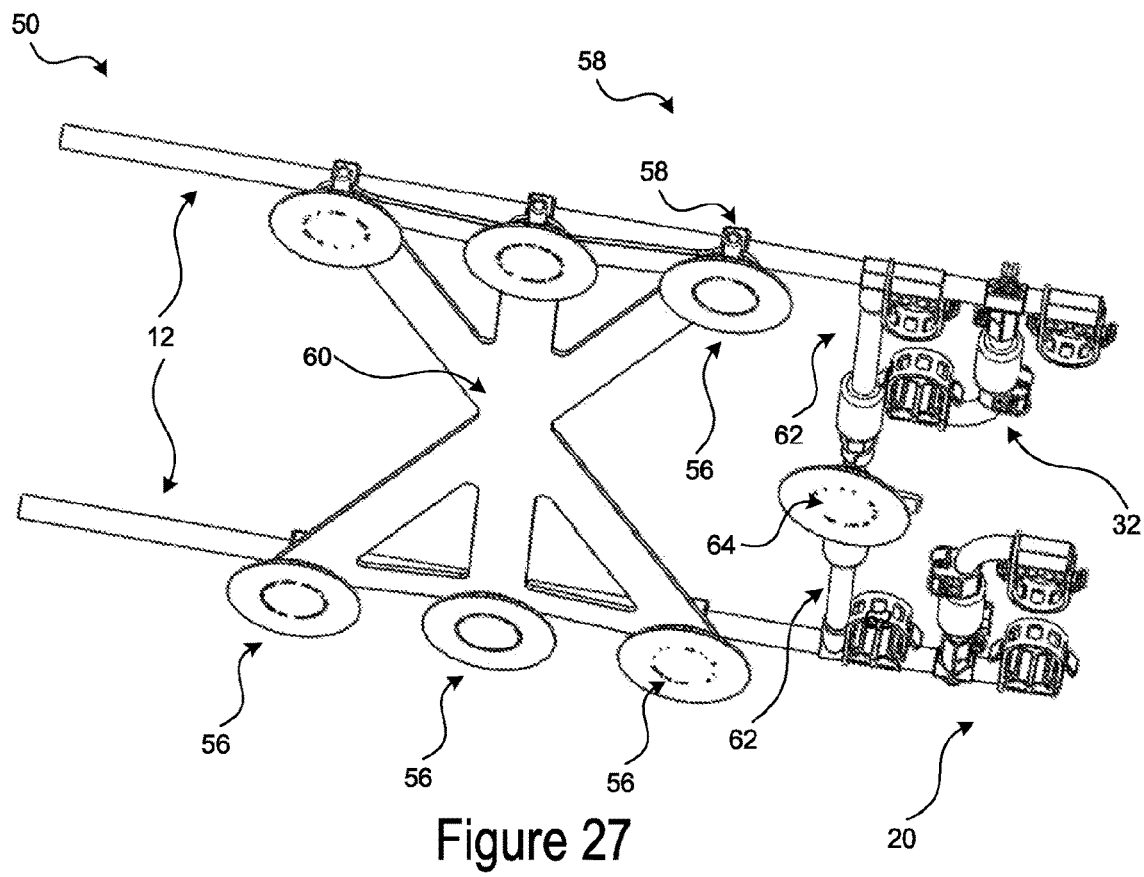
FIG. 27 is another perspective view of the second bicycle rack in the reposed position.

Further, in the bicycle carrying position, the arms 24 are pivoted downwardly and extended downwardly and inwardly towards each other to permit each rack securing element 28 to mate with an external surface/part of the vehicle to support and stabilize the rack 10. In this example embodiment, the rack securing elements 28, and specifically the U-shaped ends thereof, meet at and mate with a rear door handle 46 on the rear door 44, as is best shown in FIG. 15.

Finally, still referring to the bicycle carrying position, the wheel supporting members 32 are pivoted downwardly and inwardly and adjusted as required. In an example, a member 32 may be configured to abut an external surface of a front wheel 47 of the bicycle 43 (as shown in FIGS. 16 to 19), with its mounting strap 36 secured around the tyre and the tyre abutting the well portion of the member 32, thereby supporting the bicycle 43 at a point below the roof 40, as shown in FIGS. 16 to 19.

Figure 34:
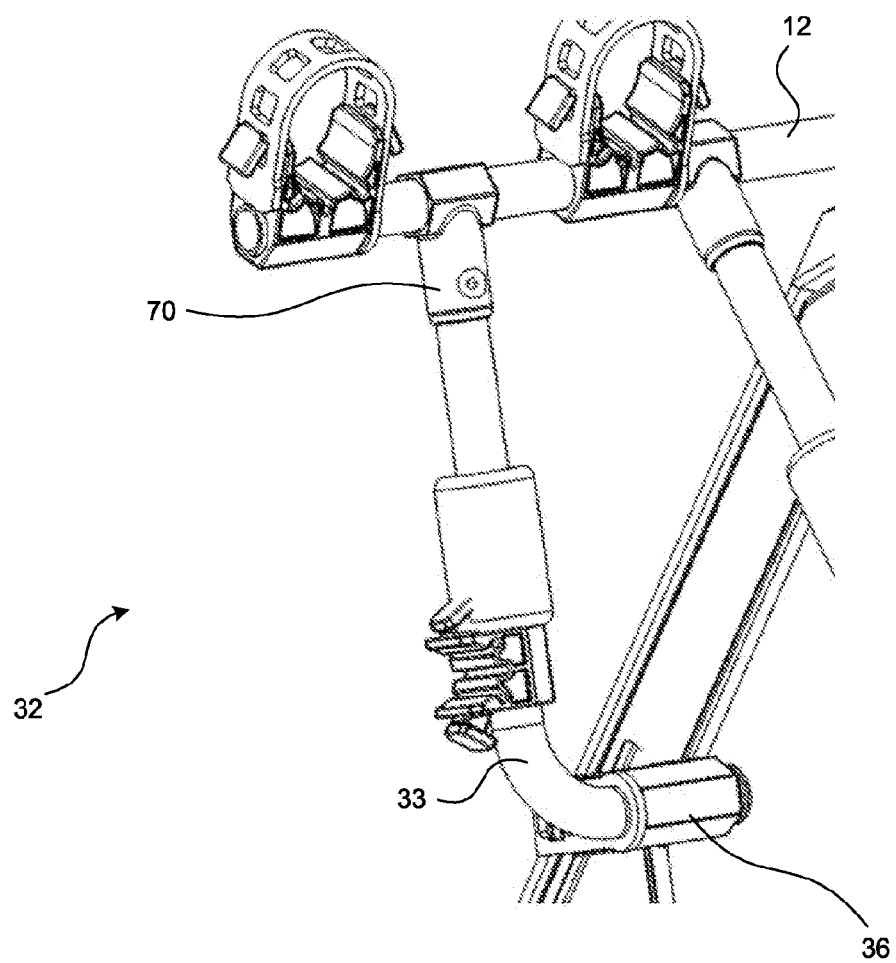
FIG. 34 is a partial perspective view showing the push button spring clip removably connecting the second section of a front wheel supporting member to the T-piece.

Turning now to FIGS. 20 to 23, as mentioned above, the second section 33 of the wheel supporting member 32 is removable. The second section 33 is removably clamped to the T-piece 34 by way of a clamp 35. The T-piece 34 is in turn clamped to the relevant tube 12, also by way of a clamp 37. The latter makes the member 32 pivotable into the desired position after which it can be locked against a bicycle as required using the clamp 37. In some embodiments, clamp 35 is not required. For example, in FIG. 34, the second section 33 is removably connected to the T-piece 34 by way of a push button spring clip 70.

Referring back to the clamp 35, it may be necessary to remove the second section 33 of the front wheel supporting member 32 (i.e. the one furthest from the vehicle) before loading a first of two bicycles onto the rack 10. As shown in FIGS. 20 to 23, the clamp 35 is released (FIG. 20) and the section 33 is removed by pulling out the elbow-shaped part 33 (FIG. 21), allowing the bicycle 43 to be lifted and moved such that its rear wheel 49 can rest on the wheel mount 22 located at the rear of the rack 10 (i.e. closest to the vehicle—see FIG. 22). After this, the section 33 can be re-installed by inserting it again and pulling the lever of the clamp 35 (FIG. 23), and a second bicycle can then be mounted to that particular supporting member 32, next to the first bicycle towards the rear of the vehicle.

It should be appreciated that the general design and configuration of the rack 10 makes it versatile and allows for various fitment options. As explained above, in the first embodiment of the rack 10, the tubes 12 are mounted to roof rails that extend along the length of the vehicle and the arms 24 are secured against a rear door handle 46 of the vehicle.

However, other configurations and installations are possible without departing from the scope of the present disclosure. FIGS. 24 to 32 illustrate a second embodiment of a bicycle rack 50 according to the present disclosure. The rack 50 may, for instance, be connected to a sport utility vehicle (SUV) 52 as shown in FIGS. 28 to 32 without requiring roof rails or bars, i.e. directly to a roof 54 of the SUV 50.

The rack 50 is very similar to the rack 10 and like reference numerals in FIGS. 24 to 32 refer to like features/components/parts in FIGS. 1 to 23. The details of the similar features, as well as the manner in which the rack 50 is moved between the reposed position and bicycle carrying position, will not be repeated here and the description below thus only highlights the differences between the rack 50 and the rack 10.

The first primary difference between the rack 50 and the rack 10 resides in the manner in which the rack 50 is mounted to a vehicle. Instead of the guides with clamps used in the case of the rack 10 to mount the rack 10 to roof rails/bars, the rack 50 attaches to the roof 54 directly using suction cups 56. Each tube 12 is slidably connected to three suction cups 56, which are spaced apart along the length of the vehicle, through three spaced apart guides 58 on top of the cups 56. A bottom part of each guide 58 is attached to a respective suction cup 56, while the guides 58 define guiding slots through which the tubes 12 extend and are slidably displaceable. The guides 58 and suction cups 56 are connected to each other by way of a planar frame 60 and in this way the tubes 12 are kept spaced apart and in a parallel orientation.

Figure 28:
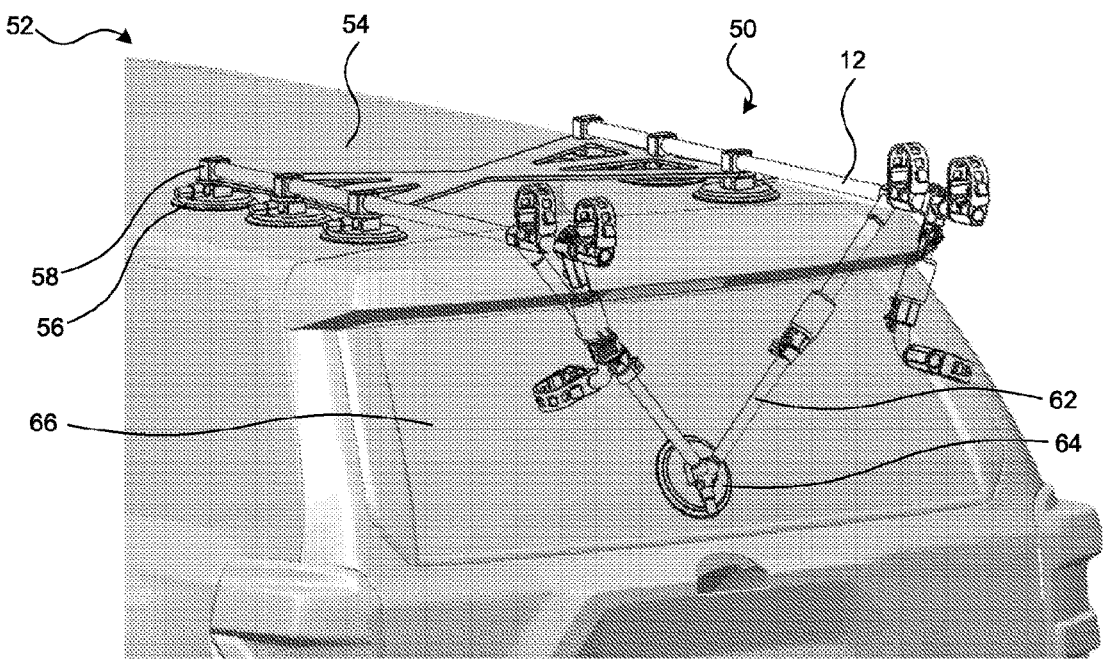
FIG. 28 is a perspective view of the second bicycle rack in use, shown in the bicycle carrying position.
Figure 29:
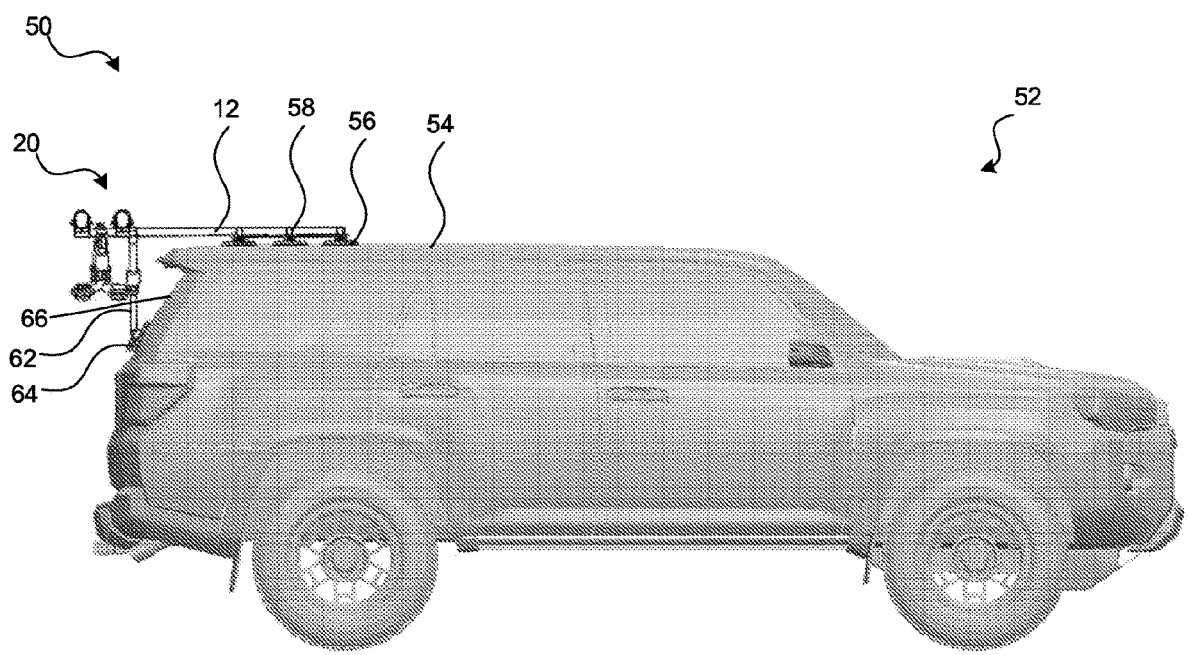
FIG. 29 is a side view of the second bicycle rack in use, in the bicycle carrying position.
Figure 30:
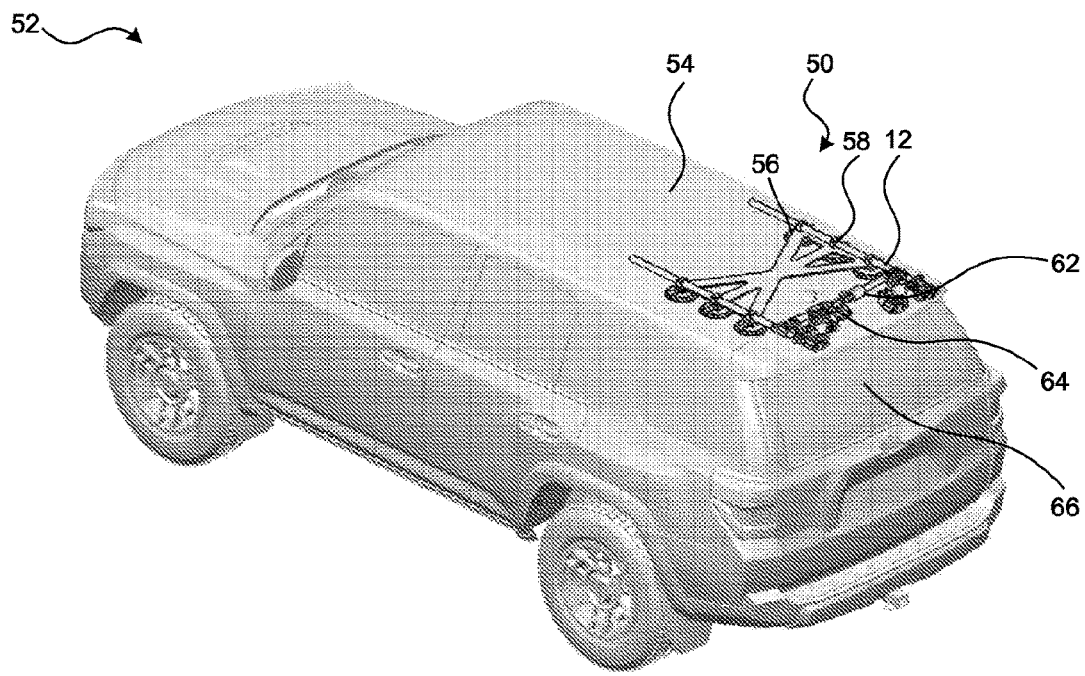
FIG. 30 is a perspective view of the second bicycle rack in use, shown in the reposed position.
Figure 31:
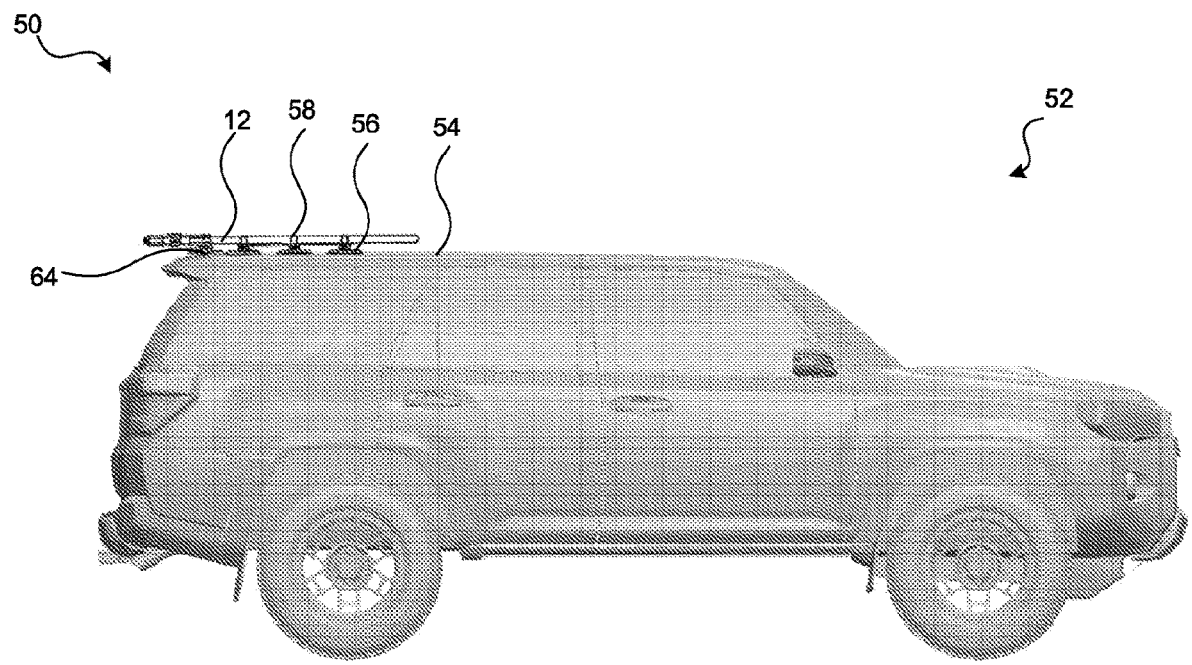
FIG. 31 is a side view of the second bicycle rack in use, in the reposed position.
Figure 32:
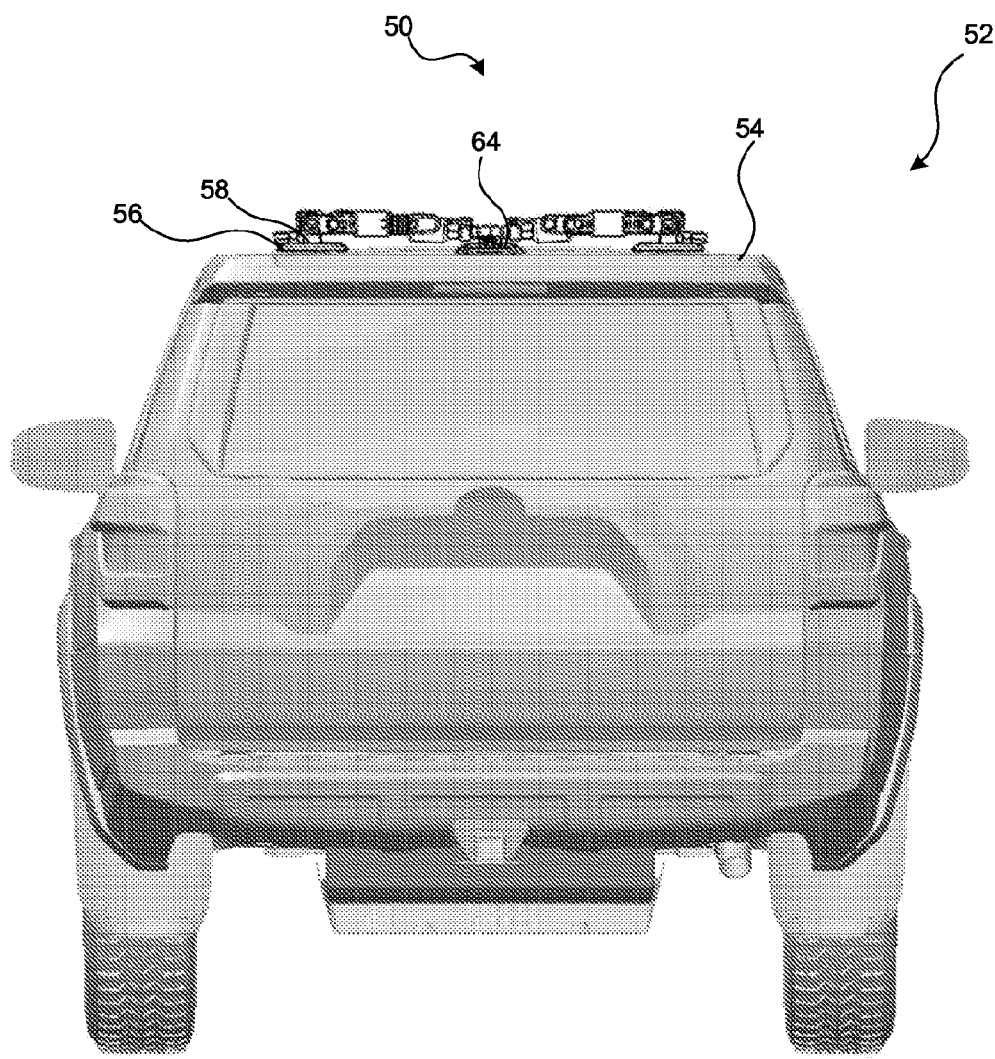
FIG. 32 is a front view of the second bicycle rack in use, showing a rear of a vehicle it is mounted to and showing the bicycle rack in the reposed position.

In use, the rack 50 functions similar to the rack 10 in that the tubes 12 can be slid between the reposed position in which they are located above the roof 54 (see FIGS. 30 to 32) and the bicycle carrying position in the section 20 of each tube 12 is clear of the roof 54 (see FIGS. 28 and 29).

The second primary difference between the rack 50 and the rack 10 resides in the end regions of the telescopic arms 62. The arms 62 are similar to the arms 24 of the rack 10 in all respects, but for the second ends thereof. In the case of the rack 10, the arms 24 terminate in rack securing elements 28 with U-shaped formations, while in the case of the rack 50 the arms 62 terminate in a suction cup 64. The suction cup 64 is used to connect the rack 50 to an external surface of the vehicle, such as a rear window 66, when in the bicycle carrying position, and also serves to inter-connect the arms 62, thereby connecting the tubes 12 such that they move in unison.

In use, the rack 50 functions similar to the rack 10 in terms of deployment from the reposed position to the bicycle carrying position, but for the difference explained above, i.e. the suction cup 64 is used to secure the rack 50 in the bicycle carrying position instead of using U-shaped ends to connect to a rear handle of the vehicle or vehicle canopy.

The Applicant believes that embodiments of the present disclosure may provide numerous benefits. The rack 10/50 can be easily attached to roof rails installed on a pickup truck (e.g. a canopy of the pickup truck) or other roof-mounted components of automobiles, or directly to the roof (e.g. of an SUV), while still allowing bicycles to be mounted behind or at the side of the vehicle instead of above the roof. Furthermore, the rack 10/50 can remain attached to the vehicle when not transporting bicycles without impeding or complicating access to the rear storage area, thus allowing for a more permanent installation.

The invention is claimed as follows:

1. A bicycle rack comprising:
a pair of elongated sliding members, wherein each sliding member is configured to be slidably connected to a roof of a vehicle, or to a respective roof connector of a vehicle, such that the elongated sliding members are positioned in parallel and displaceable along a length of the vehicle, wherein each elongated sliding member has a bicycle receiving end region which is provided with a fastening element for removably fastening a bicycle to the bicycle rack;
a plurality of connecting elements for slidably connecting the elongated sliding members to the roof of the vehicle or the roof connectors of the vehicle;
a pair of elongated, telescopic arms, wherein each arm comprises a first end connected to a respective one of the elongated sliding members, and wherein a rack securing element is provided at a second end of one or both of the arms; and
at least one wheel supporting member, wherein the wheel supporting member has a first section pivotably connected to one of the elongated sliding members and a second section defining a wheel support,
wherein the bicycle rack is operatively adjustable, through displacement of the elongated sliding members, the arms and the support member relative to the vehicle, between a reposed position and a bicycle carrying position, wherein, in the reposed position, substantially the entire length of each elongated sliding member is positioned on top of the roof, the arms are retracted and the wheel supporting member is pivoted such that the arms and the wheel supporting member are located substantially in a plane defined by the elongated sliding members, and wherein, in the bicycle carrying position, a section of each elongated sliding member extends beyond the roof such that the bicycle receiving end regions are able to receive the bicycle, the arms are extended downwardly to permit the rack securing element to mate with an external surface of the vehicle below the roof, and the wheel supporting member is pivoted downwardly to allow the wheel support to support a wheel of the bicycle at a point below the roof.

2. The bicycle rack of claim 1, wherein the roof connectors of the vehicle are a pair of parallel, spaced apart rails secured to the roof.

3. The bicycle rack of claim 2, wherein the roof of the vehicle is a roof of a vehicle canopy.

4. The bicycle rack of claim 2, wherein the connecting elements are a plurality of guides having a clamping portion for clamping the guide to the rail and a guiding section, which slidably receives one of the sliding members.

5. The bicycle rack of claim 1, wherein the bicycle rack is clear of a rear storage compartment of the vehicle in the reposed position.

6. The bicycle rack of claim 1, wherein the sliding members are tubes and wherein the fastening elements are a plurality of mounting straps for strapping a frame and a wheel of the bicycle to the tubes.

7. The bicycle rack of claim 1, wherein the connecting elements are a plurality of suction cups mounted to each sliding member via suitable guiding sections for connecting the sliding members directly to the roof.

8. The bicycle rack of claim 1, wherein the arms are a pair of telescopic struts, wherein a first end of each arm is pivotably attached to the sliding member, such that the arms can be pivoted and retracted into the reposed position.

9. The bicycle rack of claim 1, wherein the arms further comprise a second end connected to each other, thereby connecting the sliding members such that they are displaced together, in use.

10. The bicycle rack of claim 1, wherein the external surface is a rear door handle.

11. The bicycle rack of claim 1, wherein the rack securing element is a suction cup configured to secure the arms to the external surface of the vehicle.

12. The bicycle rack of claim 1, wherein the second section of the wheel supporting is an elbow-shaped tube removable from the first section by way of a releasable clamp, and wherein the first section is a T-piece pivotably connected to the sliding member.

13. The bicycle rack of claim 1, wherein the fastening elements and the wheel supports are in the form of a plurality of wheel wells with a plurality of straps.

14. The bicycle rack of claim 1, wherein the bicycle rack is configured to receive two bicycles.

15. The bicycle rack of claim 14, wherein the second section of a front one of the wheel supporting members is removed to allow a first bicycle to be mounted to a rear one of the wheel supporting members, after which the second section of the front wheel supporting member can be re-attached to permit mounting of a second bicycle.

\* \* \* \* \*